US012579621B2

(12) United States Patent
Onishi et al.

(10) Patent No.: US 12,579,621 B2
(45) Date of Patent: Mar. 17, 2026

(54) OPTICAL IMAGE PROCESSING METHOD, MACHINE LEARNING METHOD, TRAINED MODEL, MACHINE LEARNING PRE-PROCESSING METHOD, OPTICAL IMAGE PROCESSING MODULE, OPTICAL IMAGE PROCESSING PROGRAM, AND OPTICAL IMAGE PROCESSING SYSTEM

(71) Applicant: HAMAMATSU PHOTONICS K.K., Hamamatsu (JP)

(72) Inventors: Tatsuya Onishi, Hamamatsu (JP); Satoshi Tsuchiya, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 145 days.

(21) Appl. No.: 18/569,288

(22) PCT Filed: Mar. 18, 2022

(86) PCT No.: PCT/JP2022/012688
§ 371 (c)(1),
(2) Date: Dec. 12, 2023

(87) PCT Pub. No.: WO2023/276327
PCT Pub. Date: Jan. 5, 2023

(65) Prior Publication Data
US 2024/0265508 A1     Aug. 8, 2024

(30) Foreign Application Priority Data

Jun. 29, 2021     (JP) .............................. JP2021-107918

(51) Int. Cl.
*G06T 5/70*          (2024.01)
*G06T 5/60*          (2024.01)

(52) U.S. Cl.
CPC .................. *G06T 5/70* (2024.01); *G06T 5/60* (2024.01); *G06T 2207/20081* (2013.01); *G06T 2207/20182* (2013.01)

(58) Field of Classification Search
CPC ... G06T 5/60; G06T 5/70; G06T 2207/20081; G06T 2207/20084; G06T 2207/20182
See application file for complete search history.

(56) References Cited

U.S. PATENT DOCUMENTS 7,129,973 B2 * 10/2006 Raynor .............. H04N 1/32128
                                                    348/231.3
8,700,641 B2 *  4/2014 Covell .................. G06F 16/683
                                                    707/758
(Continued)

FOREIGN PATENT DOCUMENTS

JP      2020-021314 A     2/2020
JP      2020-144488 A     9/2020
WO     WO-2021/095256 A1   5/2021

OTHER PUBLICATIONS

Extended European Search Report issued on Apr. 24, 2025 in corresponding European patent application 22832490.1.
(Continued)

*Primary Examiner* — Michael B. Pierorazio
(74) *Attorney, Agent, or Firm* — Faegre Drinker Biddle & Reath LLP

(57)            ABSTRACT
An optical image processing module includes an image acquisition unit that acquires an optical image obtained by capturing an image of light from a target object, a selection unit that selects a trained model from a plurality of trained models each of which is built in advance through machine learning using condition information including photodetector information indicating a type of photodetector, and a processing unit that inputs the optical image to the selected
(Continued)

trained model and executes image processing of removing noise from the optical image.

22 Claims, 14 Drawing Sheets

(56) References Cited

U.S. PATENT DOCUMENTS

| | | | | |
|---|---|---|---|---|
| 8,996,810 | B2 * | 3/2015 | Liang | G06F 16/2365 |
| | | | | 711/119 |
| 11,215,700 | B2 * | 1/2022 | Schockaert | G01S 17/36 |
| 11,706,544 | B2 * | 7/2023 | Sawada | G06F 21/73 |
| | | | | 348/308 |
| 2007/0124756 | A1 * | 5/2007 | Covell | G06F 16/635 |
| | | | | 348/E7.071 |
| 2014/0313390 | A1 * | 10/2014 | Uemura | G03B 13/00 |
| | | | | 348/335 |
| 2015/0116822 | A1 * | 4/2015 | Mori | G02B 21/06 |
| | | | | 359/385 |
| 2016/0156972 | A1 * | 6/2016 | Oztaskent | G06Q 30/0246 |
| | | | | 725/14 |
| 2016/0327782 | A1 * | 11/2016 | Mori | A61B 1/07 |
| 2016/0377856 | A1 * | 12/2016 | Mori | H04N 9/77 |
| | | | | 348/70 |
| 2017/0094349 | A1 * | 3/2017 | Maughan | H04N 21/44226 |
| 2017/0168286 | A1 * | 6/2017 | Mori | G02B 23/2469 |
| 2017/0261135 | A1 * | 9/2017 | Mori | G02B 23/243 |
| 2017/0276925 | A1 * | 9/2017 | Mori | G02B 21/367 |
| 2018/0197306 | A1 * | 7/2018 | Fukunishi | H04N 13/211 |
| 2019/0034753 | A1 * | 1/2019 | Mori | G16B 45/00 |
| 2019/0080466 | A1 * | 3/2019 | Mori | G06T 7/70 |
| 2019/0239738 | A1 * | 8/2019 | Mori | A61B 1/00 |
| 2019/0373195 | A1 * | 12/2019 | Minagawa | H04N 25/78 |
| 2019/0383946 | A1 * | 12/2019 | Namba | G06V 20/58 |
| 2020/0242806 | A1 * | 7/2020 | Mori | H04N 13/246 |
| 2020/0268234 | A1 * | 8/2020 | Nakagawa | G02B 23/26 |
| 2021/0056695 | A1 * | 2/2021 | Mori | G06T 7/90 |
| 2021/0097656 | A1 * | 4/2021 | Kondo | G06N 3/045 |
| 2021/0166369 | A1 * | 6/2021 | Baek | G06N 3/063 |
| 2021/0166446 | A1 * | 6/2021 | Chen | G06N 3/044 |
| 2021/0192684 | A1 * | 6/2021 | Pardeshi | G06N 3/088 |
| 2021/0211312 | A1 * | 7/2021 | Lu | G11C 7/24 |
| 2022/0252857 | A1 * | 8/2022 | Mori | G06N 3/08 |
| 2022/0351806 | A1 * | 11/2022 | Rey | G06N 20/10 |

OTHER PUBLICATIONS

Zamir Syed W. et al., "CycleISP: Real Image Restoration via Improved Data Synthesis", 2020 IEEE/CVF Conference on Computer Vision and Pattern Recognition (CVPR), Jun. 13, 2020, p. 2693-p. 2702, XP033805021.

International Preliminary Report on Patentability mailed Jan. 11, 2024 for PCT/JP2022/012688.

* cited by examiner

G27

1

OPTICAL IMAGE PROCESSING METHOD, MACHINE LEARNING METHOD, TRAINED MODEL, MACHINE LEARNING PRE-PROCESSING METHOD, OPTICAL IMAGE PROCESSING MODULE, OPTICAL IMAGE PROCESSING PROGRAM, AND OPTICAL IMAGE PROCESSING SYSTEM

TECHNICAL FIELD

The present disclosure relates to an optical image processing method, a machine learning method, a trained model, a machine learning pre-processing method, an optical image processing module, an optical image processing program, and an optical image processing system.

BACKGROUND ART

Since the past, a technique of capturing an image of light from a sample that is an imaging target, acquiring image data based on the imaging result, and outputting noise-removed image data by removing noise from the image data has been known (see, for example, Patent Literature 1).

CITATION LIST

Patent Literature

[Patent Literature 1] Japanese Unexamined Patent Publication No. 2020-21314

SUMMARY OF INVENTION

Technical Problem

In noise removal processing as described above, a method of removing noise from an optical image obtained by capturing an image of light from a target object such as a sample using a trained model based on machine learning may be used. However, in that case, the relationship between luminance and noise in an image tends to fluctuate depending on the imaging conditions of a target object such as, for example, the type of photodetector used to capture an image of the target object, which results in a tendency for it not to be possible to effectively remove noise.

The present disclosure was contrived in view of such a problem, and an object thereof is to provide an optical image processing method, a machine learning method, a trained model, a machine learning pre-processing method, an optical image processing module, an optical image processing program, and an optical image processing system that make it possible to effectively remove noise in an optical image.

Solution to Problem

According to an aspect of an embodiment, there is provided an optical image processing method including: a first image acquisition step of acquiring an optical image obtained by capturing an image of light from a target object; a selection step of using imaging information relating to capturing an image of the target object to select a trained model from a plurality of trained models each of which is built in advance through machine learning; and a processing step of inputting the optical image to the selected trained model and executing image processing of removing noise from the optical image.

Alternatively, according to another aspect of an embodiment, there is provided an optical image processing module including: a first image acquisition unit configured to acquire an optical image obtained by capturing an image of light from a target object; a selection unit configured to use imaging information relating to capturing an image of the target object to select a trained model from a plurality of trained models each of which is built in advance through machine learning; and a processing unit configured to input the optical image to the selected trained model and execute image processing of removing noise from the optical image.

Alternatively, according to another aspect of an embodiment, there is provided an optical image processing program causing a processor to function as: an image acquisition unit configured to acquire an optical image obtained by capturing an image of light from a target object; a selection unit configured to use imaging information relating to capturing an image of the target object to select a trained model from a plurality of trained models each of which is built in advance through machine learning; and a processing unit configured to input the optical image to the selected trained model and execute image processing of removing noise from the optical image.

Alternatively, according to another aspect of an embodiment, there is provided an optical image processing system including: the optical image processing module; and an imaging device configured to acquire the optical image by capturing an image of light from the target object.

According to any of the above aspect or another aspect, the imaging information relating to capturing an image of the target object is used, and the trained model to be used for noise removal is selected from the trained models built in advance. Thereby, the trained model selected in accordance with the imaging environment that changes with the imaging conditions of the target object, the optical image of the target object, or the like is used for noise removal, and thus it is possible to realize noise removal corresponding to a change in the imaging conditions of the target object. As a result, it is possible to effectively remove noise in the optical image.

According to another aspect of an embodiment, there is provided a machine learning method including a building step of using a structure image to which noise is added based on a predetermined noise distribution model as a training image and using the training image and noise-removed image data which is data obtained by removing noise from the training image as training data to build a trained model that outputs the noise-removed image data on the basis of the training image through machine learning. The optical image processing module may further include a building unit configured to use a structure image to which noise is added based on a predetermined noise distribution model as a training image and use the training image and noise-removed image data which is data obtained by removing noise from the training image as training data to build a trained model that outputs the noise-removed image data on the basis of the training image through machine learning. According to the above configuration, the optical image is input to the trained model, and thus it is possible to realize noise removal processing that makes it possible to effectively remove noise from the optical image of the target object.

According to another aspect of an embodiment, there is provided a trained model built using the machine learning method, the trained model causing a processor to execute image processing of removing noise from an optical image of a target object. Thereby, the trained model is used, and thus it is possible to realize noise removal processing that makes it possible to effectively remove noise from the optical image of the target object.

Further, according to the other aspect described above, there is provided a machine learning pre-processing method including a training image generation step of generating a structure image to which noise is added based on the noise distribution model as the training image. Thereby, when the optical image is input to the trained model built using the training image generated using the above pre-processing method, it is possible to realize noise removal processing that makes it possible to effectively remove noise from the optical image of the target object.

Advantageous Effects of Invention

According to an aspect and another aspect of the present embodiment, it is possible to provide an optical image processing method, a machine learning method, a trained model, a machine learning pre-processing method, an optical image processing module, an optical image processing program, and an optical image processing system that make it possible to effectively remove noise in an optical image.

DESCRIPTION OF EMBODIMENTS

Figure 1:
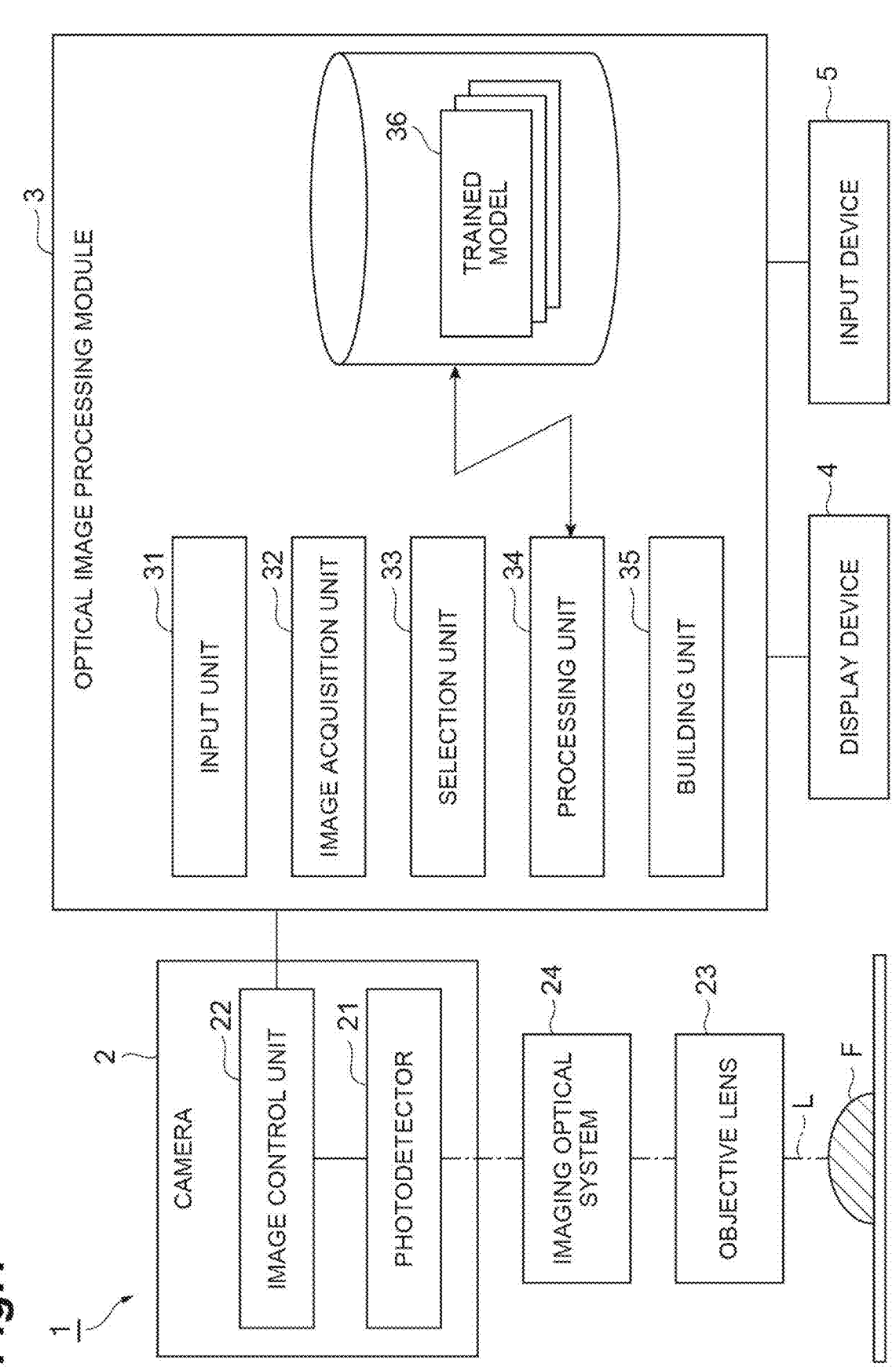
FIG. 1 is a block diagram illustrating a functional configuration of an optical image processing system according to a first embodiment.

Hereinafter, an embodiment of the present disclosure will be described in detail with reference to the accompanying drawings. Meanwhile, the same or equivalent portions in the drawings are denoted by the same reference numerals and signs, and thus description thereof will not be repeated.

First Embodiment

FIG. 1 is a block diagram illustrating a functional configuration of an optical image processing system 1 according to a first embodiment. As shown in FIG. 1, the optical image processing system 1 is a system that acquires an optical image obtained by capturing an image of a target object F on the basis of light L from the target object F. The light L is, for example, light emitted from the target object F, transmitted light from the target object F, reflected light from the target object F, or scattered light from the target object F. Examples of the light L include ultraviolet rays, visible rays, and infrared rays. Hereinafter, the above light may be referred to as observation light. The optical image processing system 1 includes a camera (imaging device) 2, an optical image processing module 3, a display device 4, and an input device 5.

The camera 2 acquires an optical image by capturing an image of the light L from the target object F. The camera 2 includes a photodetector 21 and an image control unit 22. The photodetector 21 is an imaging element having a plurality of pixels. Examples of the photodetector 21 include a charge coupled device (CCD) image sensor, a complementary metal-oxide semiconductor (CMOS) image sensor, a photodiode, an InGaAs sensor, a time delay integration (TDI)-CCD image sensor, a TDI-CMOS image sensor, an imaging tube, an electron multiplying (EM)-CCD image sensor, an electron bombarded (EB)-CMOS image sensor, a single photon avalanche diode (SPAD, single-pixel photon counter (SPPC)), a multi-pixel photon counter (MPPC), silicon photomultiplier (SiPM), a hybrid photo detector (HPD), an avalanche photodiode (APD), and a photomultiplier tube (PMT). In addition, the photodetector 21 may be a CCD image sensor, a CMOS image sensor, or the like combined with an image intensifier (I.I) or a micro-channel plate (MCP). Examples of the shapes of the photodetector 21 include an area sensor, a line sensor that acquires an image through line scanning, a TDI sensor, and a point sensor that acquires an image through two-dimensional scanning. The camera 2 captures an image of the light L from the target object F formed by an imaging optical system 24 through an objective lens 23, and outputs a digital signal based on the imaging result to the image control unit 22.

The image control unit 22 executes image processing based on a digital signal from the photodetector 21. The image control unit 22 is constituted by, for example, a central processing unit (CPU), a graphics processing unit (GPU), a field-programmable gate array (FPGA), or the like. The image control unit 22 generates image data on the basis of the digital signal received from the photodetector 21, applies predetermined image processing to the generated image data, and then outputs the data to the optical image processing module 3.

The optical image processing module 3 is a computer such as, for example, a personal computer (PC). The optical image processing module 3 performs image processing on the image data output from the camera 2 to generate an optical image from which noise has been removed. The optical image processing module 3 is connected to each of the camera 2, the display device 4, and the input device 5 in a wired or wireless manner so as to communicate with each other. The generated optical image is output to the display device 4 after noise removal processing to be described later is performed, and is displayed by the display device 4.

Various types of input information such as imaging conditions of the target object F are input to the optical image processing module 3 from the input device 5 on the basis of a user's operation. In addition, the optical image processing module 3 controls the camera 2. Meanwhile, although the optical image processing module 3 of the first embodiment is a device provided independently outside the camera 2, it may be integrated inside the camera 2. For example, the optical image processing module 3 may be a module equivalent to a processing circuit mounted in a camera such as a CPU or a GPU.

Figure 2:
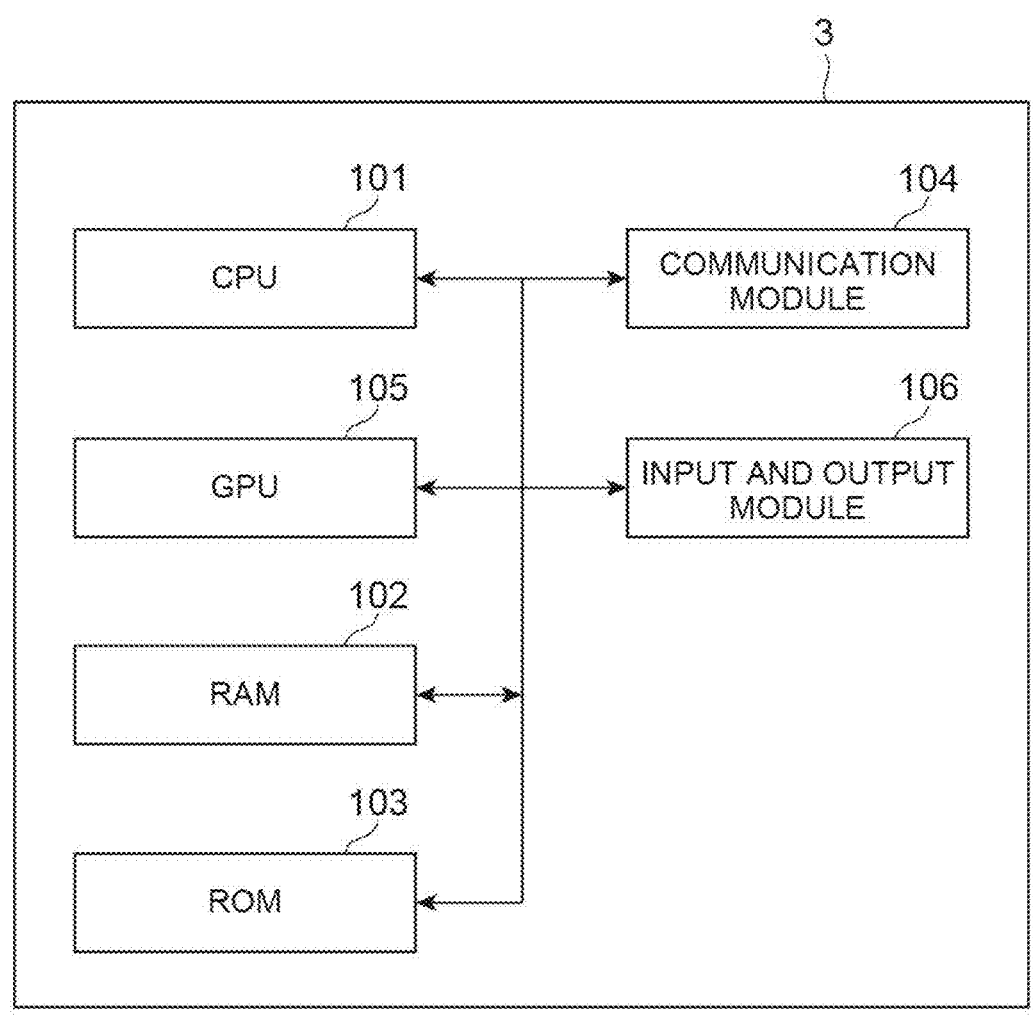
FIG. 2 is a diagram illustrating a hardware configuration of an optical image processing module in FIG. 1.

FIG. 2 shows a hardware configuration of the optical image processing module 3. As shown in FIG. 2, the optical image processing module 3 is a computer or the like physically including a central processing unit (CPU) 101 and a graphics processing unit (GPU) 105 which are processors, a random access memory (RAM) 102 and a read only memory (ROM) 103 which are recording media, a communication module 104, an input and output module 106, and the like, which are electrically connected to each other. Meanwhile, the optical image processing module 3 may include a display, a keyboard, a mouse, a touch panel display, and the like as the display device 4 and the input device 5, or may include a data recording device such as a hard disk drive or a semiconductor memory. In addition, the optical image processing module 3 may be constituted by a plurality of computers.

As shown in FIG. 1, the optical image processing module 3 includes an input unit 31, an image acquisition unit (first image acquisition unit) 32, a selection unit 33, a processing unit 34, and a building unit 35. Each functional unit of the optical image processing module 3 shown in FIG. 1 is realized by loading a program (an optical image processing program of the first embodiment) on the hardware such as the CPU 101, the GPU 105, and the RAM 102 to thereby bring the communication module 104, the input and output module 106, and the like into operation under the control of the CPU 101 and the GPU 105 and read out and write data in the RAM 102. The CPU 101 and the GPU 105 of the optical image processing module 3 cause the optical image processing module 3 to function as each functional unit shown in FIG. 1 by executing this computer program, and sequentially execute processing corresponding to an optical image processing method to be described later. Meanwhile, the CPU 101 and the GPU 105 may be a single piece of hardware, or only one may be used. In addition, the CPU 101 and the GPU 105 may be implemented in a programmable logic such as an FPGA like a soft processor. The RAM or the ROM may also be a single piece of hardware, or may be built into a programmable logic such as an FPGA. Various types of data required for executing this computer program and various types of data generated by executing this computer program are all stored in a built-in memory such as the ROM 103 or the RAM 102, or a storage medium such as a hard disk drive. In addition, a built-in memory or a storage medium in the optical image processing module 3 stores in advance a plurality of trained models 36 which are read by the CPU 101 and the GPU 105 and cause the CPU 101 and the GPU 105 to execute noise removal processing on an optical image. The details of the trained models 36 will be described later. Hereinafter, there are cases in which one trained model 36 is described, but in such cases, the same applies to the other trained models 36.

Figure 3:
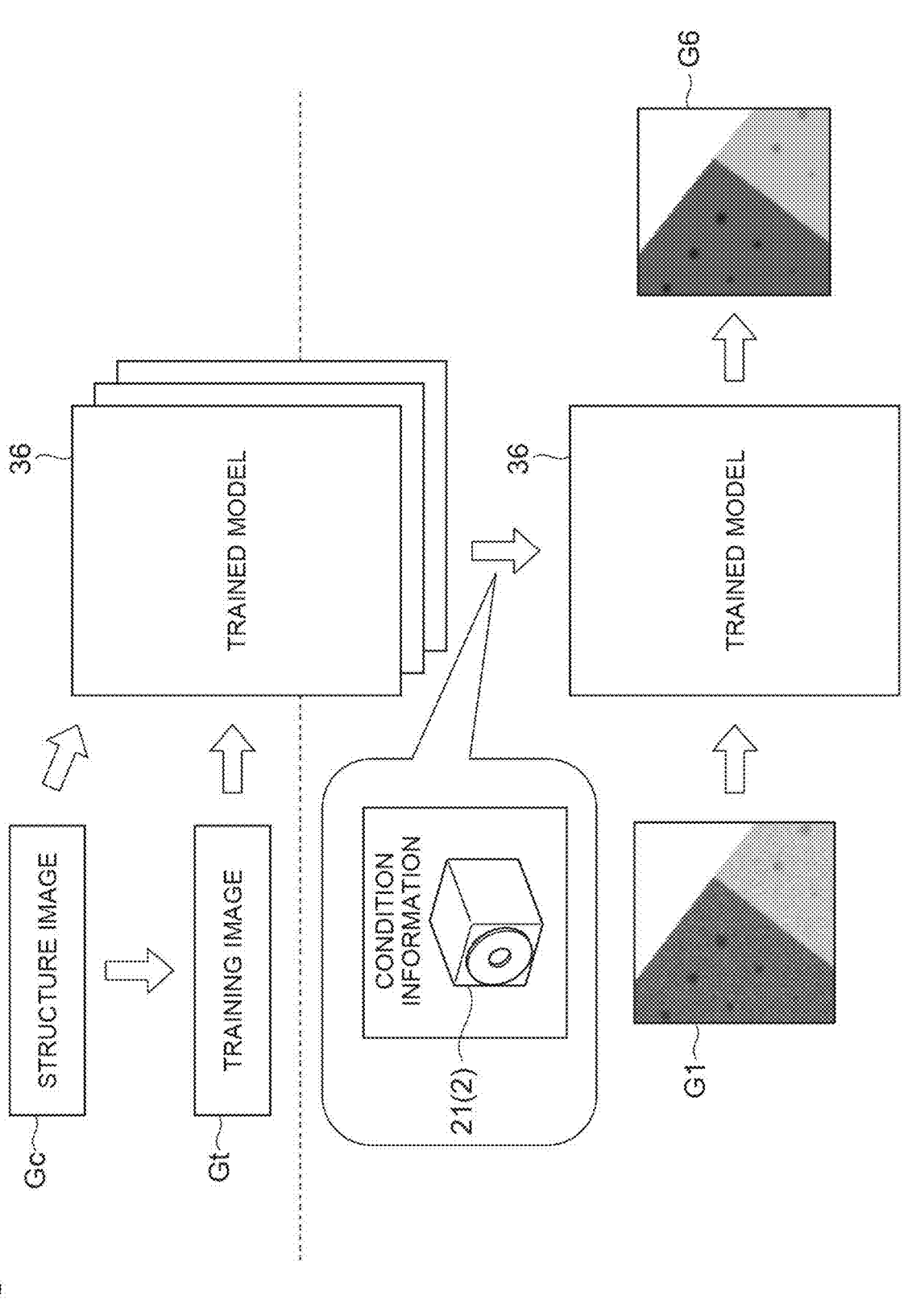
FIG. 3 is a diagram illustrating an example of input and output data of a trained model in FIG. 1.

Here, an overview of an optical image processing method of the optical image processing module 3 will be described with reference to FIG. 3. FIG. 3 is a diagram illustrating an example of input and output data of the trained model 36 in FIG. 1. In the optical image processing module 3, a plurality of trained models 36 are built in a learning phase based on machine learning, and the trained models 36 are used in a noise removal phase to generate an optical image G6 from which noise of an optical image G1 of the target object F has been removed. First, in the learning phase, the optical image processing module 3 creates a structure image Gc which is an image of a structure having a predetermined structure, and generates a training image (structure image) Gt serving as training data on the basis of the structure image Gc and a noise distribution model (the details of which will be described later). The optical image processing module 3 then builds the plurality of trained models 36 through machine learning using training data including the training image Gt or the like. In the noise removal phase, the optical image processing module 3 first acquires condition information. The condition information indicates imaging conditions including the type of photodetector 21 when an image of the target object F is captured. The optical image processing module 3 selects a trained model 36 to be used for noise removal processing of the optical image G1 from the plurality of trained models 36 in accordance with the type of photodetector 21. The optical image processing module 3 then inputs the optical image G1 to the selected trained model 36 and executes image processing of removing noise from the optical image to thereby generate and output the optical image G6 from which noise has been removed.

The details of the function of each functional unit of the optical image processing module 3 will be described below.

The input unit 31 accepts an input of the condition information (imaging information). The condition information is information relating to image capturing of the target object F and indicates imaging conditions and the like when an image of the target object F is captured. Specifically, the input unit 31 accepts an input of the condition information from a user of the optical image processing system 1. The condition information includes at least one of photodetector information, a gain setting value, a shading correction coefficient, an offset, a noise factor, information indicating dark current noise generated due to thermal noise in the photodetector 21, and information indicating a readout noise value in the photodetector 21. The photodetector information is information indicating the type of photodetector 21 used to capture an image of the target object F. Examples of the photodetector information include information indicating any of a CCD image sensor, a CMOS image sensor, a photodiode, an InGaAs sensor, a TDI-CCD image sensor, a TDI-CMOS image sensor, an imaging tube, an EM-CCD image sensor, an EB-CMOS image sensor, an SPAD, an MPPC, an HPD, an APD, and a photomultiplier tube. The input unit 31 may accept an input of the condition information as a direct input of information such as numerical values, or may accept the input as a selective input for information such as numerical values which are set in an internal memory in advance. The input unit 31 accepts the input of the condition information from a user, but it may acquire some condition information (such as the type of photodetector 21) in accordance with the detection result of the state of control performed by the optical image processing module 3.

Figure 4:
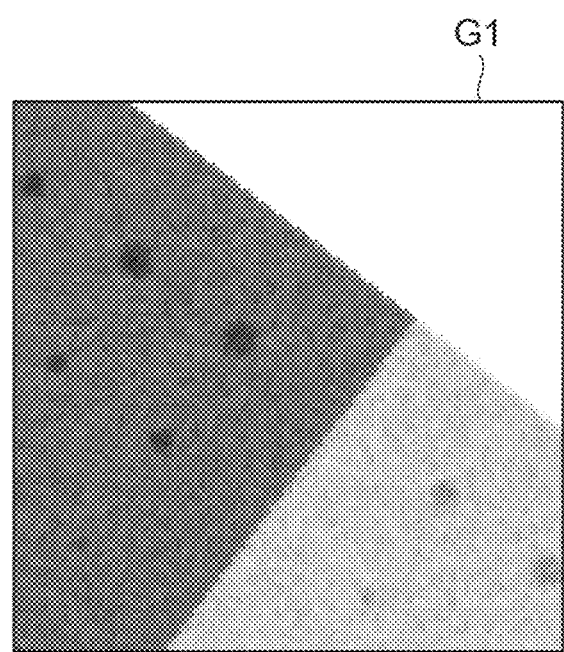
FIG. 4 is a diagram illustrating an example of an optical image acquired by an image acquisition unit.

The image acquisition unit 32 acquires an optical image obtained by capturing an image of light from the target object F. Specifically, the image acquisition unit 32 acquires the optical image output from the camera 2. FIG. 4 is a diagram illustrating an example of the optical image G1 acquired by the image acquisition unit 32.

The selection unit 33 uses the condition information (imaging information) to select a trained model 36 to be used for noise removal processing of the optical image from the plurality of trained models 36 each of which is built in advance through machine learning. Specifically, the selection unit 33 refers to the photodetector information included in the condition information to select a trained model 36 in accordance with the type of photodetector 21 indicated by the photodetector information (condition information). That is, the selection unit 33 selects the most suitable trained model 36 for the photodetector 21 used to capture an image of the target object F. The details of a process of selecting a trained model 36 according to the type of photodetector 21 will be described later.

The processing unit 34 inputs the optical image to the selected trained model 36, and executes image processing of removing noise from the optical image. That is, as shown in FIG. 3, the processing unit 34 acquires the trained model 36 selected by the selection unit 33 from the built-in memory or storage medium in the optical image processing module 3. The processing unit 34 then inputs the optical image G1 acquired by the image acquisition unit 32 to the trained model 36. Thereby, the processing unit 34 executes image processing of removing noise from the optical image G1 using the trained model 36 to generate the optical image G6 from which noise has been removed. The processing unit 34 then outputs the generated optical image G6 to the display device 4 or the like.

The building unit 35 uses a structure image to which noise is added based on a predetermined noise distribution model as a training image and uses the training image and noise-removed image data which is data obtained by removing noise from the training image as training data to build a trained model 36 that outputs the noise-removed image data on the basis of the training image through machine learning. In the present embodiment, the building unit 35 builds the plurality of trained models 36 using a predetermined noise distribution model according to the type of photodetector 21 that can be input as the condition information. The type of photodetector 21 that can be input as the condition information is a type indicated by the photodetector information that can be input to the above-described input unit 31 (such as, for example, a CCD image sensor or a CMOS image sensor). The building unit 35 then stores a plurality of built trained models 36 in the built-in memory or storage medium in the optical image processing module 3. Examples of machine learning include supervised learning, unsupervised learning, and reinforcement learning, including deep learning, neural network learning, and the like. In the first embodiment, the two-dimensional convolutional neural network described in the paper "Beyond a Gaussian Denoiser: Residual Learning of Deep CNN for Image Denoising" authored by Kai Zhang et al. is adopted as an example of a deep learning algorithm. Meanwhile, each trained model 36 may be generated by an external computer or the like and downloaded to the optical image processing module 3 in addition to being built by the building unit 35. Meanwhile, the optical image used for machine learning includes an optical image obtained by capturing an image of a known structure or an image obtained by reproducing the optical image. The training image may be an image actually generated for multiple types of known structures, or may be an image generated by simulation calculation.

As pre-processing for performing machine learning, the building unit 35 generates a structure image to which noise is added based on a noise distribution model as a training image. The structure image is an image obtained by capturing an image of light from a structure having a predetermined structure.

Specifically, when each trained model 36 is built, the building unit 35 acquires condition information including photodetector information during simulation calculation from the input unit 31. The building unit 35 then generates a structure image. The building unit 35 then adds noise to the structure image on the basis of the noise distribution model selected on the basis of the photodetector information. That is, the machine learning pre-processing method includes an input step of accepting an input of condition information including photodetector information indicating the type of photodetector 21 used to capture an image of the target object F, and a training image generation step of generating a structure image to which noise is added based on the noise distribution model as a training image. In the training image generation step, the noise distribution model to be used is determined from the photodetector information.

The building unit 35 builds each trained model 36 through machine learning using the training data prepared for each trained model 36. Specifically, the building unit 35 first acquires in advance the noise-removed image data obtained by removing noise from the training image. The building unit 35 uses the image before noise is added in the process of generating the training image as the noise-removed image data. The building unit 35 builds a trained model 36 that outputs the noise-removed image data on the basis of the training image by executing training through machine learning.

Figure 5:
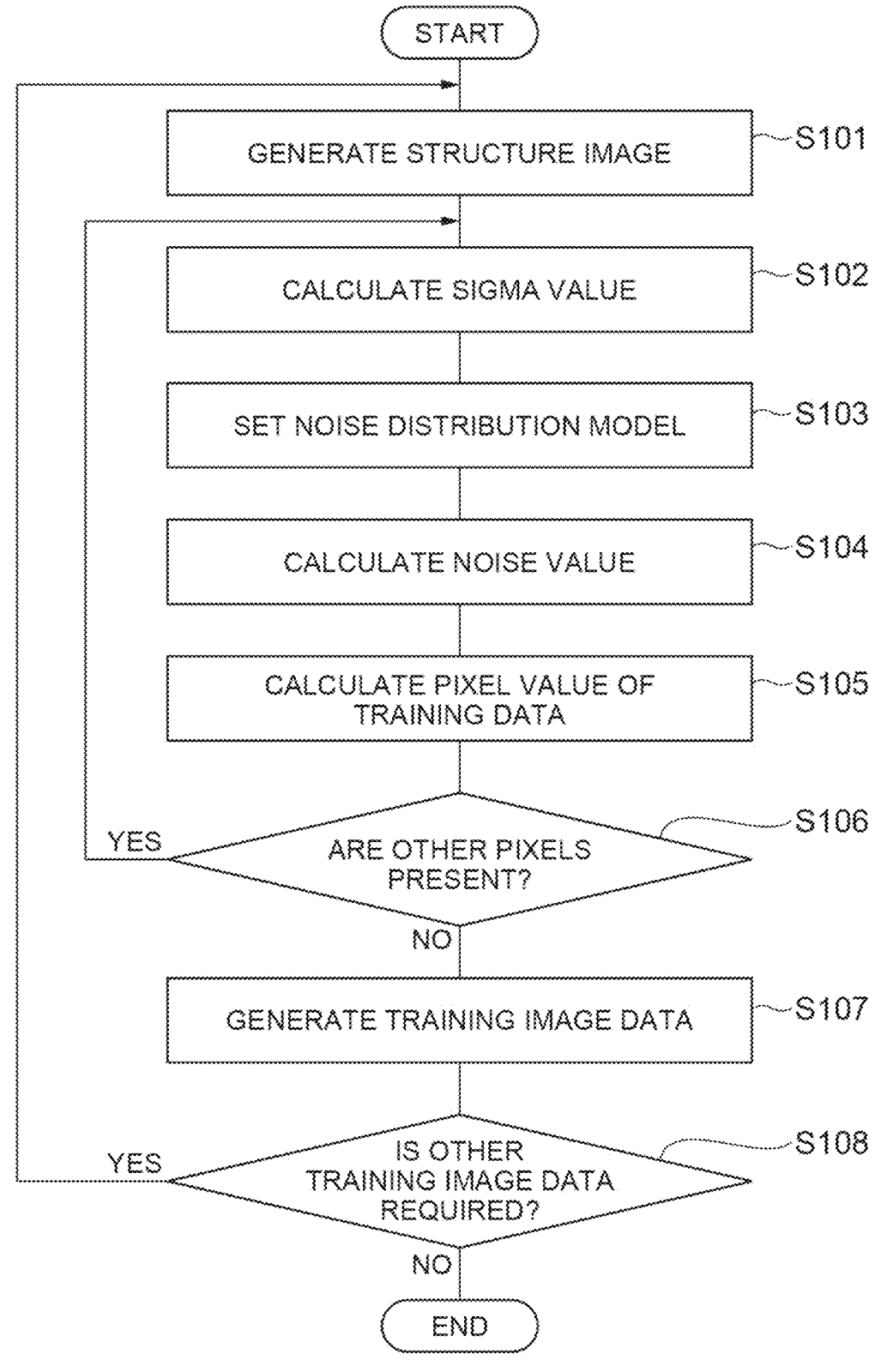
FIG. 5 is a flowchart illustrating a procedure of creating a training image included in training data which is used to build a trained model by a building unit.

FIG. 5 is a flowchart illustrating a procedure of creating a training image included in training data used to build the trained model 36 by the building unit 35.

A training image (also referred to as a training image) which is training data is created in the next procedure. First, the building unit 35 generates a structure image (step S101). The building unit 35 may, for example, create a structure image through simulation calculation. Next, a sigma value which is a standard deviation of pixel values is calculated for one pixel selected from a plurality of pixels constituting the structure image (step S102). The sigma value calculated in step S102 indicates the magnitude of noise. The building unit 35 selects a suitable relational expression from the following Expressions (1), (2), and (3) which will be described later on the basis of the photodetector information. Using the selected relational expression, the building unit 35 substitutes the pixel value of a pixel of the structure image into the variable Signal, calculates the variable Noise of the pixel, and obtains the calculated variable Noise of the pixel as the magnitude of noise (sigma value) (the details of which will be described later).

Here, a method of calculating the magnitude of noise will be described. The building unit 35 selects one relational expression from a plurality of relational expressions of noise on the basis of the photodetector information included in the condition information. That is, the building unit 35 selects the most suitable relational expression for the photodetector 21 in accordance with the type of photodetector 21. The building unit 35 then obtains the magnitude of noise of a pixel in the structure image as the magnitude of noise on the basis of the relational expression and the structure image.

In the present embodiment, the building unit 35 selects one relational expression from the following three relational expressions. In a case where the photodetector 21 is not an electron multiplication type, the building unit 35 selects the following Expression (1) as a relational expression. As an example, in a case where the photodetector information indicates any of a CCD image sensor, a CMOS image sensor, a photodiode, an InGaAs sensor, a TDI-CCD image sensor, a TDI-CMOS image sensor, and an imaging tube having no photomultiplier mechanism, the building unit 35 selects the following Expression (1) as a relational expression.

[Expression 1]

$$\text{Noise} = \sqrt{\left(\sqrt{Cf \cdot \text{Signal}}\right)^2 + \left(\sqrt{D}\right)^2 + R^2} \tag{1}$$

In Expression (1), the variable Noise is the standard deviation of noise values, the constant Cf is a conversion coefficient for converting the signal value of a pixel into an electric charge in the camera 2, the variable Signal is the signal value (pixel value) of a pixel, the constant D is information indicating dark current noise, and the constant R is information indicating a readout noise value. Reference numerals commonly used in expressions to be described below are assumed to indicate the same elements, and the description thereof will be omitted.

When Expression (1) is used, the pixel value of each pixel in the optical image acquired by the image acquisition unit 32 is substituted into the variable Signal by the building unit 35. The variable Noise calculated using Expression (1) is then obtained by the building unit 35 as a numerical value of the standard deviation of noise values. Meanwhile, other parameters in Expression (1) may be acquired by the input unit 31 accepting an input, or may be set in advance.

In a case where the photodetector 21 is an electron multiplication type and not a photon counting type, the building unit 35 selects the following Expression (2) as a relational expression. As an example, in a case where the photodetector information indicates any of an EM-CCD an image sensor, an EB-CMOS image sensor, an SPAD, an HPD, an APD, a photomultiplier tube, and an MPPC, the building unit 35 selects the following Expression (2) as a relational expression.

[Expression 2]

$$\text{Noise} = \sqrt{\left(F\sqrt{G \cdot Cf \cdot \text{Signal}}\right)^2 + \left(F \cdot G\sqrt{D}\right)^2 + R^2} \tag{2}$$

In Expression (2), the constant F is a noise factor, and the constant G is information indicating a gain setting value. When Expression (2) is used, as in the case of Expression (1), the pixel value of each pixel in the optical image acquired by the image acquisition unit 32 is substituted into the variable Signal by the building unit 35. The variable Noise calculated using Expression (2) is then obtained by the building unit 35 as a numerical value of the standard deviation of noise values. Meanwhile, each of the constant F and the constant G in Expression (2) may be acquired by the input unit 31 accepting an input, or may be set in advance.

In a case where the photodetector 21 is an electron multiplication type and a photon counting type, the building unit 35 selects the following Expression (3) as a relational expression. As an example, in a case where the photodetector information operates for the purpose of photon counting by using a photomultiplier tube, an HPD, an MPPC, or the like, the building unit 35 selects the following Expression (3) as a relational expression.

[Expression 3]

$$\text{Noise} = \sqrt{\left(F\sqrt{G \cdot Cf \cdot \text{Signal}}\right)^2 + \left(F \cdot G\sqrt{D}\right)^2} \tag{3}$$

In Expression (3), the variable Signal is information indicating a photon counting number. When Expression (3) is used, as in the case of Expression (1), the pixel value of each pixel in the optical image acquired by the image acquisition unit 32 is substituted into the variable Signal by the building unit 35. The variable Noise calculated using Expression (3) is then obtained by the building unit 35 as a numerical value of the standard deviation of noise values. In this way, the building unit 35 obtains the variable Noise of the pixel as the magnitude of noise using any of Expressions (1), (2) and (3).

Subsequently, the building unit 35 then sets a noise distribution model on the basis of the sigma value obtained in step S102 (step S103). The building unit 35 acquires condition information from the input unit 31 and sets the noise distribution model in accordance with the photodetector information included in the condition information. Examples of the noise distribution model include a normal distribution model, a Poisson distribution model, and a Bessel function distribution model. In addition, the condition information further includes information indicating the amount of the light L. The building unit 35 refers to the photodetector information to set the normal distribution model as the noise distribution model in a case where the photodetector 21 is not an electron multiplication type and the amount of the light L is not small. In addition, in a case where the photodetector 21 is not an electron multiplication type and the amount of the light L is small, the building unit 35 sets the Poisson distribution model as the noise distribution model. As an example, the building unit 35 sets the normal distribution model as the noise distribution model in a case where the photodetector information is any of a CCD image sensor, a CMOS image sensor, a photodiode, an InGaAs sensor, a TDI-CCD image sensor, a TDI-CMOS image sensor, and an imaging tube having no photomultiplier mechanism and the amount of light is equal to or greater than a reference value determined in advance. In addition, as an example, the building unit 35 refers to the condition information to set the Poisson distribution model as the noise distribution model in a case where the photodetector information is any of a CCD image sensor, a CMOS image sensor, a photodiode, an InGaAs sensor, a TDI-CCD image sensor, a TDI-CMOS image sensor, and an imaging tube and the amount of light is less than the reference value. Meanwhile, the noise distribution model may include only one of the normal distribution model and the Poisson distribution model. On the other hand, the building unit 35 sets the Bessel function distribution model as the noise distribution model in a case where the photodetector 21 is a multi-stage electron multiplication type with a multiplication factor of 2 per stage. As an example, the building unit 35 sets the Bessel function distribution model as the noise distribution model in a case where the photodetector information is an EM-CCD image sensor. By setting the normal distribution model or the Bessel function distribution model in this way, it is possible to generate training data with various noise conditions. Meanwhile, in a case where the photodetector information does not correspond to any of the above photodetectors, the building unit 35 may create a new noise distribution model by calculating a histogram and creating a function indicating the noise distribution. The histogram is a histogram of pixel values of an optical image when light having the same amount of light is caused to be incident on the photodetector 21. The building unit 35 calculates the histogram, for example, by acquiring a plurality of optical images obtained by capturing an image of a light source of which the amount of light does not change over time. As an example, the horizontal axis of the histogram is the luminance value of the camera 2, and the vertical axis of the histogram is a frequency. Since the noise distribution varies depending on the amount of light, the building unit 35 further acquires a plurality of histograms by changing the amount of light of the light source within the range of the amount of light that can be assumed during use of the optical image processing system 1, and creates a noise distribution model.

Subsequently, the building unit 35 calculates a randomly set noise value on the basis of the magnitude of noise (sigma value) acquired in step S102 and the noise distribution model set on the basis of the sigma value in step S103 (step S104). Subsequently, the building unit 35 adds the noise value obtained in step S104 to the pixel value of one pixel to generate pixel values constituting a training image which is training data (step S105). The building unit 35 performs the processes of steps S102 to S105 on each of the plurality of pixels constituting the structure image (step S106), and generates a training image serving as training data (step S107). In addition, in a case where more training images are required, the processes of steps S101 to S107 are determined to be performed on another structure image (step S108), and another training image serving as training data is generated. Meanwhile, another structure image may be an image of a structure having the same structure, or may be an image of a structure having a different structure.

Meanwhile, it is necessary to prepare a large number of training images which are training data used to build the trained model 36. In addition, the structure image is preferably an image with little noise, ideally an image with no noise. Therefore, generating a structure image through simulation calculation enables a large number of noise-free images to be generated, and thus generating a structure image through simulation calculation is effective.

Figure 6:
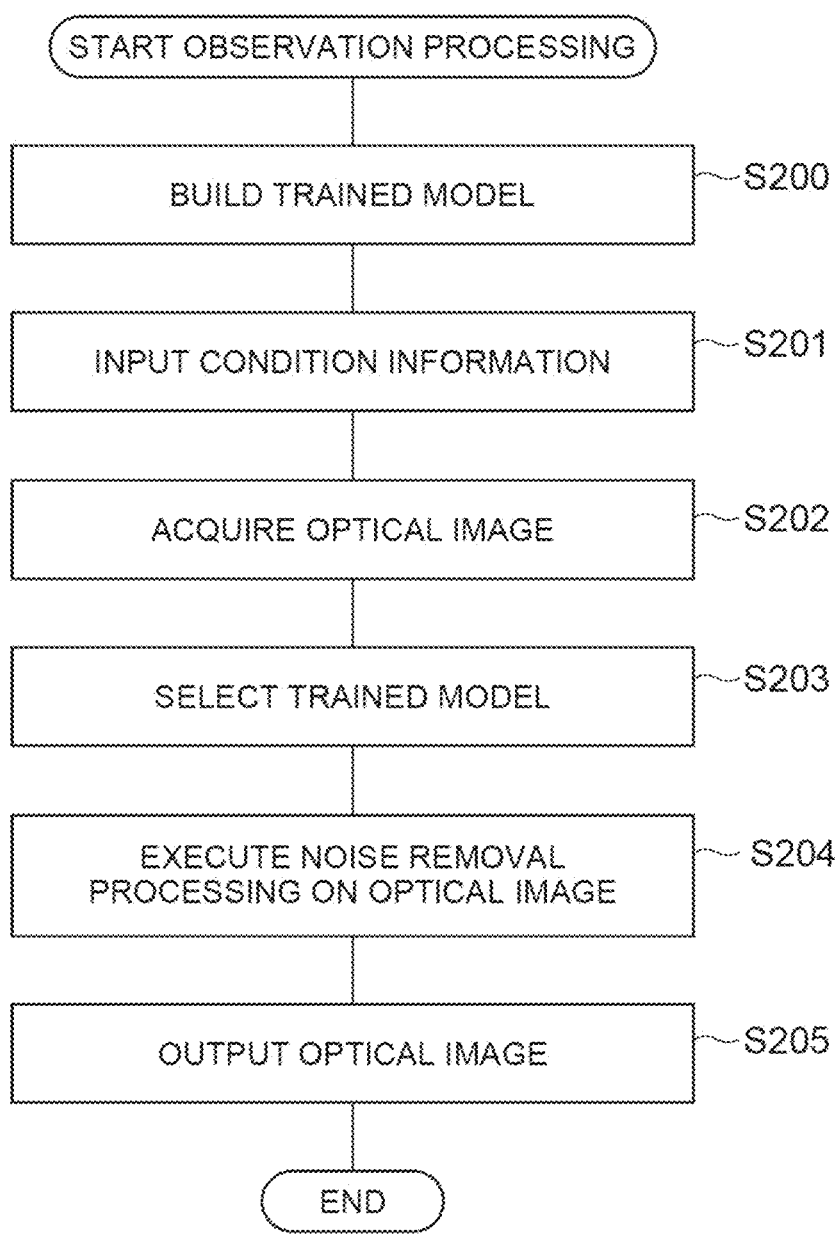
FIG. 6 is a flowchart illustrating a procedure of observation processing performed by the optical image processing system including an optical image processing module.

Next, a procedure of observation processing of an optical image of the target object F using the optical image processing system 1 according to the first embodiment, that is, a flow of the optical image acquisition method according to the first embodiment will be described. FIG. 6 is a flowchart illustrating a procedure of observation processing performed by the optical image processing system 1 including the optical image processing module 3.

First, the building unit 35 uses the training image and the noise-removed image data as training data to build a plurality of trained models 36 that output the noise-removed image data on the basis of the training image through machine learning (step S200). Next, the input unit 31 accepts an input of condition information indicating imaging conditions and the like from an operator (user) of the optical image processing system 1 (step S201).

Subsequently, the target object F is set and an image of the target object F is captured in the optical image processing system 1, and an optical image of the target object F is acquired by the image acquisition unit 32 (step S202). Further, the selection unit 33 uses the photodetector information included in the condition information to select a trained model 36 from the plurality of trained models 36 each of which is built in advance through machine learning (step S203).

Specifically, in a case where the photodetector 21 indicated by the photodetector information is not an electron multiplication type and the amount of light is not small, the selection unit 33 selects a trained model 36 built with the normal distribution model set as the noise distribution model (hereinafter sometimes referred to as a "trained model 36 of the normal distribution model"). As an example, the selection unit 33 selects the trained model 36 of the normal distribution model in a case where the photodetector information is any of a CCD image sensor, a CMOS image sensor, a photodiode, an InGaAs sensor, a TDI-CCD image sensor, a TDI-CMOS image sensor, and an imaging tube and information indicating the amount of light is equal to or greater than a reference value. In addition, in a case where the photodetector 21 indicated by the photodetector information is not an electron multiplication type and the amount of light is small, the selection unit 33 selects a trained model 36 built with the Poisson distribution model set as the noise distribution model (hereinafter sometimes referred to as a "trained model 36 of the Poisson distribution model"). As an example, the selection unit 33 selects the trained model 36 of the Poisson distribution model in a case where the photodetector information indicates one of the above photodetectors and information indicating the amount of light is less than the reference value. On the other hand, in a case where the photodetector 21 indicated by the photodetector information is an electron multiplication type, the selection unit 33 selects a trained model 36 built with the Bessel function distribution model set as the noise distribution model (hereinafter sometimes referred to as a "trained model 36 of the Bessel function distribution model"). As an example, in a case where the photodetector information is an EM-CCD image sensor, the selection unit 33 selects the trained model 36 of the Bessel function distribution model. That is, in a case where the photodetector 21 of the camera 2 is not an electron multiplication type, the selection unit 33 selects a trained model 36 built to be suitable for the photodetector 21 which is not an electron multiplication type. In addition, in a case where the photodetector 21 of the camera 2 is an electron multiplication type, the selection unit 33 selects a trained model 36 built to be suitable for the photodetector 21 which is an electron multiplication type.

Next, the processing unit 34 inputs the optical image of the target object F to the trained model 36 selected by the selection unit 33, and executes noise removal processing on the optical image (step S204). Further, the processing unit 34 outputs the optical image that has undergone noise removal processing to the display device 4 (step S205).

According to the optical image processing module 3 described above, the condition information indicating the imaging conditions when an image of the target object F is captured is used, and the trained model 36 to be used for noise removal is selected from the trained models 36 built in advance. Thereby, the trained model 36 selected in accordance with the imaging environment that changes with the imaging conditions of the target object F is used for noise removal, and thus it is possible to realize noise removal corresponding to a change in the imaging conditions of the target object F. As a result, it is possible to effectively remove noise in the optical image.

In particularly, in the optical image processing module 3 of the first embodiment, the input unit 31 accepts an input of the condition information indicating the imaging conditions when an image of the target object F is captured, the selection unit 33 uses the condition information to select a trained model 36 to be used for the above noise removal processing, each trained model 36 is a trained model built in advance through machine learning using the noise distribution model, and the selection unit 33 selects the trained model 36 built in advance corresponding to the condition information. Thereby, the most suitable trained model 36 is selected from the plurality of trained models 36 that appropriately remove noise in consideration of the imaging conditions of the target object F, and thus it is possible to remove noise from the optical image of the target object F corresponding to a change in the imaging conditions. Meanwhile, when the condition information is the same, the same trained model 36 can be used even if the imaging environment of the target object F is different.

Here, an example of the effect of noise removal processing performed by the optical image processing module 3 of the first embodiment will be described. For example, in an example in which a CMOS image sensor (C13440-20 ORCA (registered trademark)-Flash4.0 V3 manufactured by Hamamatsu Photonics K.K.) is used as the photodetector 21, and the target object F is irradiated with visible light as observation light, the standard deviation of noise in the optical image G1 (see FIG. 3) was 3.31, and the standard deviation of noise in the optical image G6 was 0.32. In an example in which a CMOS image sensor (C14440-20 ORCA (registered trademark)-Fusion manufactured by Hamamatsu Photonics K.K.) different from the above CMOS image sensor is used as the photodetector 21, and the target object F is irradiated with visible light as observation light, the standard deviation of noise in the optical image G1 was 6.91, and the standard deviation of noise in the optical image G6 was 0.66. In an example in which a CMOS image sensor (C15440-20 ORCA (registered trademark)-FusionBT manufactured by Hamamatsu Photonics K.K.) different from the two CMOS image sensors is used as the photodetector 21, and the target object F is irradiated with visible light as observation light, the standard deviation of noise in the optical image G1 was 6.91, and the standard deviation of noise in the optical image G6 was 0.65. In an example where an InGaAs sensor (C12741-03 InGaAs camera manufactured by Hamamatsu Photonics K.K.) is used as the photodetector 21, and the target object F is irradiated with infrared light as observation light, the standard deviation of noise in the optical image G1 was 7.54, and the standard deviation of noise in the optical image G6 was 2.69. Meanwhile, in each of the above examples, the photodetector 21 which is not an electron multiplication type is used, and thus the normal distribution model is set as the noise distribution model.

In an example in which an EM-CCD image sensor (C9100-23B ImagEM (registered trademark) X2 EM-CCD camera manufactured by Hamamatsu Photonics K.K.) is used as the photodetector 21, the amplification factor is 300 times, and the target object F is irradiated with visible light as observation light, the following results were obtained. Specifically, in a case where the digital value was 2,200 (count), the standard deviation of noise in the optical image G1 was 41.5, and the standard deviation of noise in the optical image G6 was 5.66. In addition, in a case where the digital value was 2,500 (count), the standard deviation of noise in the optical image G1 was 44.1, and the standard deviation of noise in the optical image G6 was 7.73. In addition, in an example where the amplification factor is 1,200 times under the above condition, the following results were obtained. Specifically, in a case where the digital value was 2,200 (count), the standard deviation of noise in the optical image G1 was 86.9, and the standard deviation of noise in the optical image G6 was 13.2. In addition, in a case where the digital value was 2,500 (count), the standard deviation of noise in the optical image G1 was 91.5, and the standard deviation of noise in the optical image G6 was 15.5. Meanwhile, in each of the above examples, the electron multiplication-type photodetector 21 is used, and thus the Bessel function distribution model is set as the noise distribution model.

As shown in each of the above examples, according to the optical image processing module 3 of the first embodiment, the most suitable trained model 36 is selected from the plurality of trained models 36 in accordance with the type of photodetector 21, and thus it is possible to obtain the optical image G6 from which noise in the optical image G1 is effectively removed.

In the optical image processing module 3 of the first embodiment, the condition information includes the photodetector information (information) indicating the type of photodetector 21 used to capture an image of the target object F, each trained model 36 is a trained model built in accordance with the type of photodetector 21 that can be input as the condition information, and the selection unit 33 selects the trained model 36 built in advance using the noise distribution model corresponding to the type of photodetector 21 indicated by the photodetector information. Generally, it can be said that the characteristics of noise with respect to luminance differ depending on the type of photodetector 21. According to the above configuration, the trained model 36 corresponding to the photodetector 21 used to capture an image of the target object F is selected from the plurality of trained models 36 built in accordance with the type of photodetector 21, and thus it is possible to remove noise from the optical image of the target object F corresponding to the photodetector 21 used for the target object F.

In the optical image processing module 3 of the first embodiment, the noise distribution model used to build the trained model 36 includes a normal distribution model. Thereby, for example, in a case where the general photodetector 21 which is not an electron multiplication type is used to capture an image of the target object F, it is possible to effectively remove noise from the optical image by selecting the trained model 36 built through machine learning using the normal distribution model.

In the optical image processing module 3 of the first embodiment, the noise distribution model used to build the trained model 36 includes a Bessel function distribution model. Thereby, for example, in a case where the electron multiplication-type photodetector 21 is used to capture an image of the target object F, it is possible to effectively remove noise from the optical image by selecting the trained model 36 built through machine learning using the Bessel function distribution model.

The optical image processing module 3 of the first embodiment includes the building unit 35 that uses a structure image to which noise is added based on a predetermined noise distribution model as a training image and uses the training image and noise-removed image data which is data obtained by removing noise from the training image as training data to build a trained model 36 that outputs the noise-removed image data on the basis of the training image through machine learning. According to the above configuration, when an optical image is input to the trained model 36, it is possible to realize noise removal processing that makes it possible to effectively remove noise from the optical image of the target object F.

The optical image processing module 3 of the first embodiment has a pre-processing function of generating a structure image to which noise is added based on the noise distribution model as a training image. Thereby, when an optical image is input to the trained model 36 generated using the above pre-processing method and built using the training image for the above machine learning method, it is possible to realize noise removal processing that makes it possible to effectively remove noise from the optical image of the target object F.

The optical image processing module 3 of the first embodiment has a function of accepting an input of condition information including the photodetector information indicating the type of photodetector 21 used to capture an image of the target object F and determining a noise distribution model to be used from the photodetector information in the process of generating a training image. The relationship between the pixel value and noise in an optical image varies depending on the type of photodetector 21 used to capture an image of the target object F. According to the above configuration, it is possible to obtain a training image in which noise is appropriately added to the optical image in consideration of the type of photodetector 21 used to capture an image of the target object F. As a result, it is possible to build a trained model 36 that executes noise removal in the optical image of the target object F corresponding to the photodetector 21.

In the pre-processing of the optical image processing module 3 of the first embodiment, the noise distribution model used to generate a training image includes a normal distribution model and a Poisson distribution model. Thereby, for example, in a case where the general photodetector 21 which is not an electron multiplication type is used to capture an image of the target object F, it is possible to obtain a training image in which noise is appropriately added to a structure image. As a result, it is possible to build a trained model 36 that executes noise removal in the optical image of the target object F corresponding to the photodetector 21. In particular, the noise distribution model further includes a Poisson distribution model in addition to the normal distribution model, and thus it is possible to obtain a training image in which noise is appropriately added to the structure image even in a case where the amount of the light L is small.

In the pre-processing of the optical image processing module 3 of the first embodiment, the noise distribution model includes a Bessel function distribution model. Thereby, for example, in a case where the electron multiplication-type photodetector 21 is used to capture an image of the target object F, it is possible to obtain a training image in which noise is appropriately added to the structure image. As a result, it is possible to build a trained model 36 that executes noise removal in the optical image of the target object F corresponding to the photodetector 21.

Second Embodiment

Figure 7:
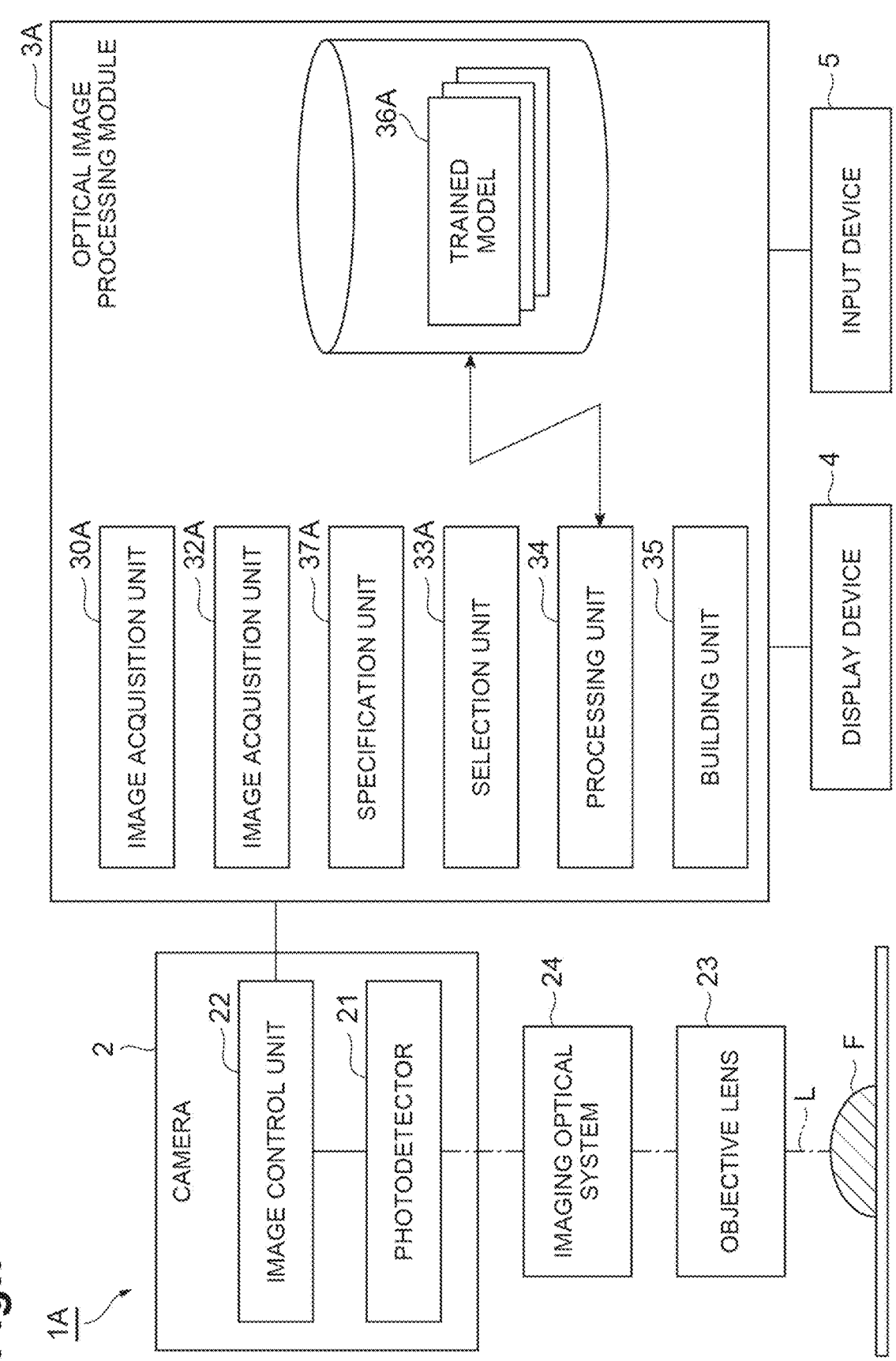
FIG. 7 is a block diagram illustrating a functional configuration of an optical image processing system according to a second embodiment.
Figure 8:
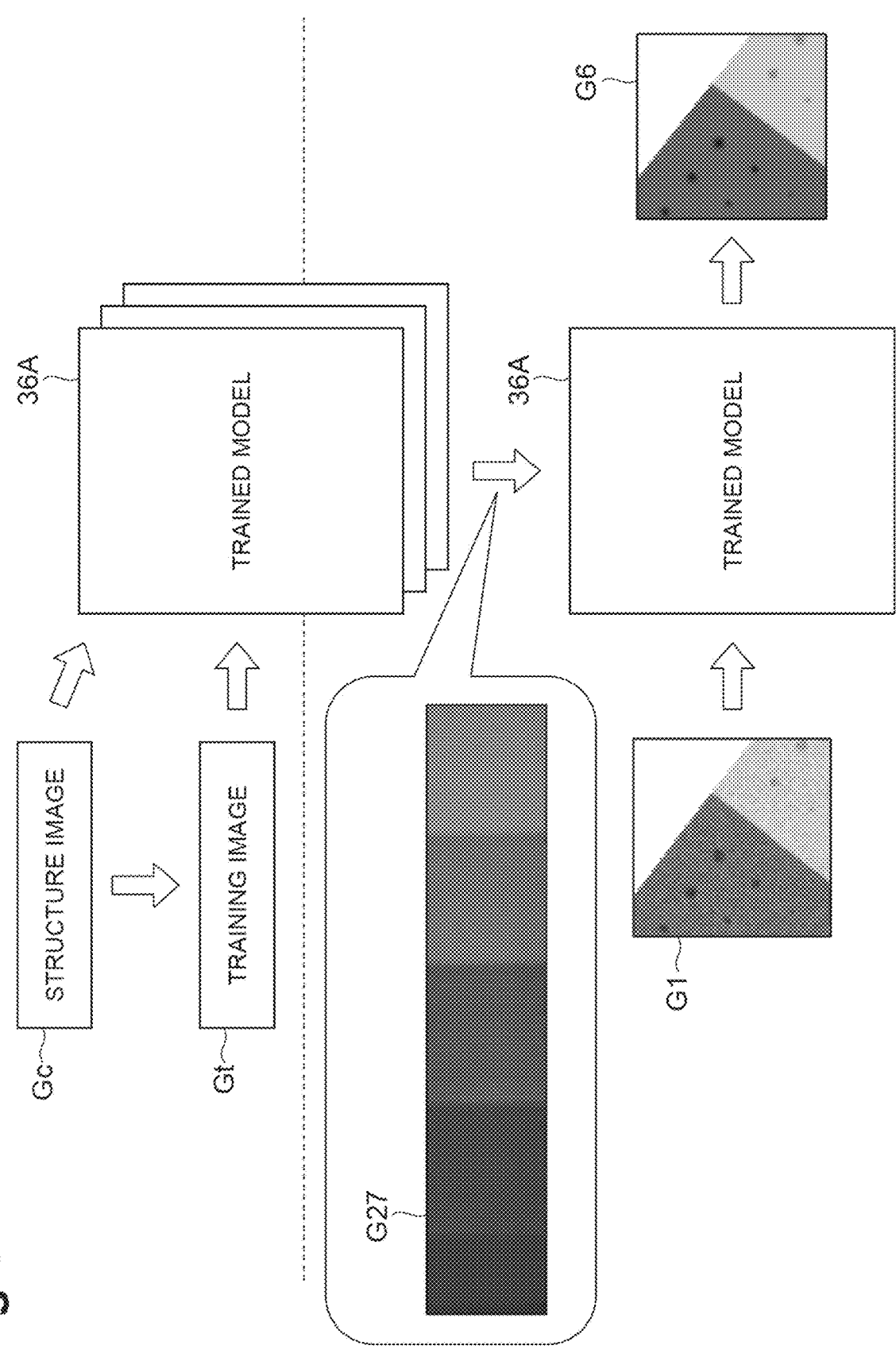
FIG. 8 is a diagram illustrating an example of input and output data of a trained model in FIG. 9.

FIG. 7 is a block diagram illustrating a functional configuration of an optical image processing system 1A according to a second embodiment. FIG. 8 is a diagram illustrating an example of input and output data of a trained model 36A in FIG. 7. An optical image processing module 3A of the second embodiment is different from the above-described first embodiment in that it has an image acquisition unit (second image acquisition unit) 30A and a specification unit 37A. Further, the optical image processing module 3A is different from the above-described first embodiment in that each trained model 36A is a learning model built in advance through machine learning using image data and that a selection unit 33A has a function of selecting a trained model 36A from a plurality of trained models 36A using the image characteristics of a jig image (optical image of a structure) which is an optical image of a jig (structure) (the details of which will be described later). Specifically, as shown in FIG.

8, in the noise removal phase, the optical image processing module 3A first acquires a jig image G27. The optical image processing module 3A specifies the image characteristics of the jig image G27 on the basis of the jig image G27, and selects a trained model 36A to be used for noise removal processing on the basis of the specified image characteristics. Each trained model 36A is a trained model based on machine learning built in advance using image data as training data. As the training data, image data captured with various types of photodetectors 21, gain setting values, readout modes, and the like can be used. The image data may be an optical image actually generated for multiple types of target objects F using the optical image processing module 3A, or may be image data generated by simulation calculation.

Figure 9:
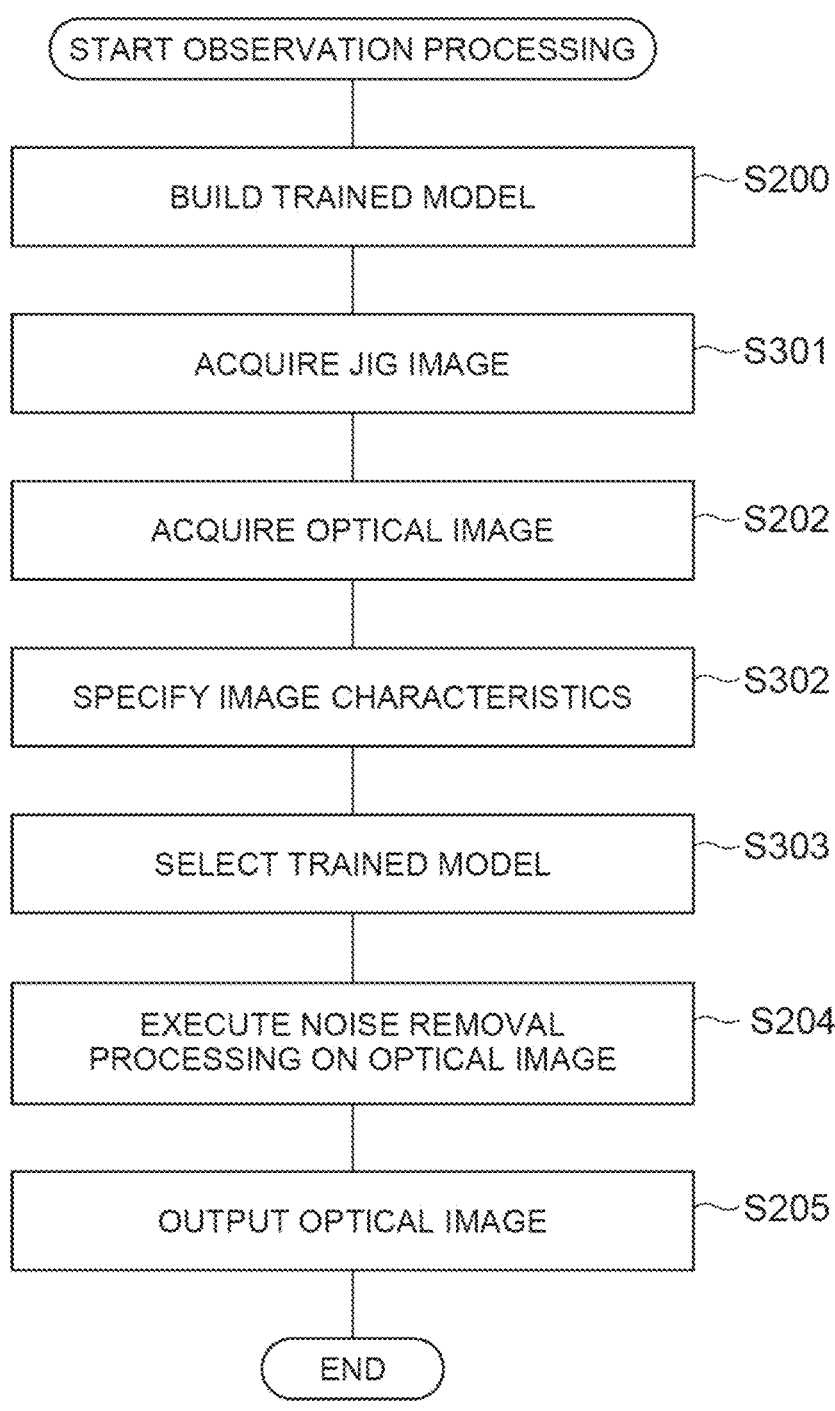
FIG. 9 is a flowchart illustrating a procedure of observation processing performed by the optical image processing system including an optical image processing module.

FIG. 9 is a flowchart illustrating a procedure of observation processing performed by the optical image processing system 1A including the optical image processing module 3A in FIG. 7. As shown in FIG. 9, in the optical image processing module 3A according to the second embodiment, the processes shown in steps S301 and S303 are executed in place of the processes of steps S201 and S203 performed by the optical image processing module 3 of the first embodiment shown in FIG. 6.

The image acquisition unit 30A acquires a jig image by capturing an image of light from the jig (step S301). Specifically, the image acquisition unit 30A acquires an optical image obtained by capturing an image of light from the jig using the camera 2. Examples of the light from the jig include fluorescence from the jig, reflected light from the jig, transmitted light from the jig, scattered light from the jig, and the like. The jig to be used is a jig having a grayscale chart that enables evaluation of gradation performance with density steps that change step by step or a chart of various resolutions. That is, the image acquisition unit 30A acquires the jig image G27 captured using the camera 2 in advance of the observation processing of the target object F. The image acquisition unit (first image acquisition unit) 32A then acquires an optical image of the target object F captured using the camera 2. However, the timing of acquisition of optical images of the jig and the target object F is not limited to the above, and may be simultaneous or opposite.

Subsequently, the specification unit 37A specifies the image characteristics of the jig image (step S302). Specifically, the specification unit 37A specifies luminance-noise characteristics, resolution characteristics, or the like as the image characteristics of the jig image.

In a case where a jig having a grayscale chart that enables evaluation of gradation performance with density steps that change step by step is used, the specification unit 37A can analyze the luminance value and noise for each of a plurality of measurement regions as the noise characteristics of the optical image of the jig, and acquire a characteristic graph of a luminance-to-noise ratio as the noise characteristics. The luminance-to-noise ratio of an optical image can be measured using a grayscale chart. That is, the specification unit 37A analyzes the luminance value and noise for each of a plurality of measurement regions with densities different from each other, and acquires a characteristic graph of the luminance-to-noise ratio.

Figure 10:
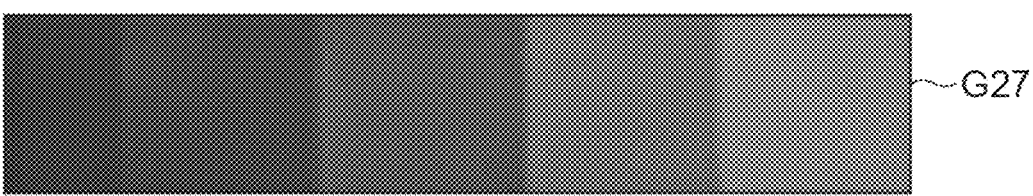
FIG. 10 is a diagram illustrating an example of a jig image used to evaluate a luminance-to-noise ratio.
Figure 11:
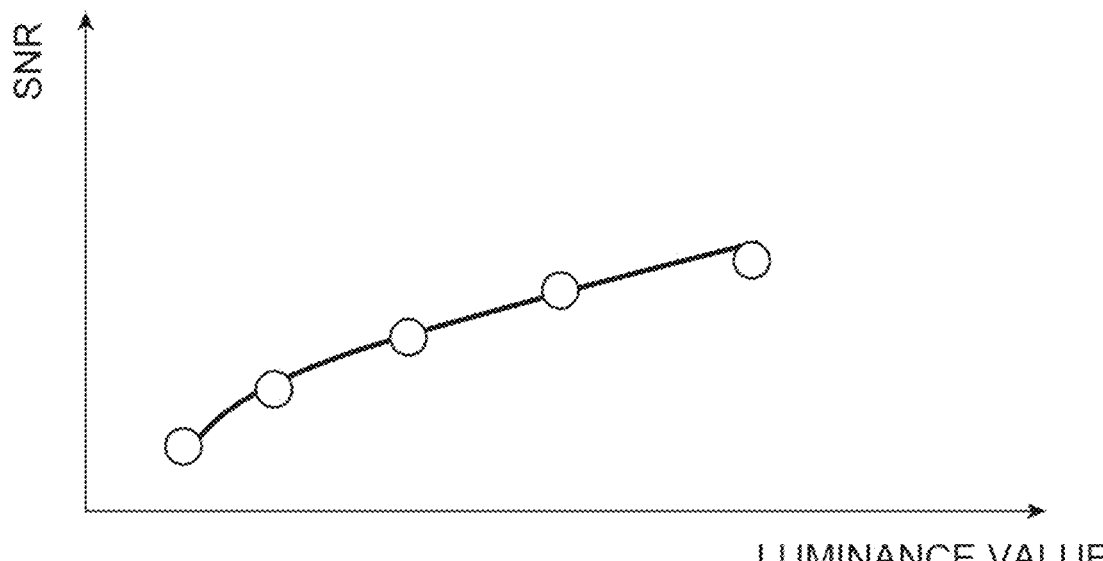
FIG. 11 is a diagram illustrating an example of a luminance-SNR characteristic graph acquired by a specification unit in FIG. 7.

Specifically, the specification unit 37A selects a plurality of measurement regions with densities different from each other, analyzes the standard deviation of luminance values and the average value of luminance values for the plurality of measurement regions, and acquires a characteristic graph of luminance-SNR (SN ratio) as the noise characteristics. In this case, the specification unit 37A calculates the SNR for each measurement region on the basis of SNR=(average value of luminance values)÷(standard deviation of luminance values). FIG. 10 shows the jig image G27 of the jig which is a grayscale chart. FIG. 11 shows an example of a luminance-SNR characteristic graph acquired by the specification unit 37A. Here, the specification unit 37A may acquire a characteristic graph with the vertical axis as noise calculated from the standard deviation of luminance value, as the noise characteristics, instead of the above luminance-SNR characteristic graph.

Figure 12:
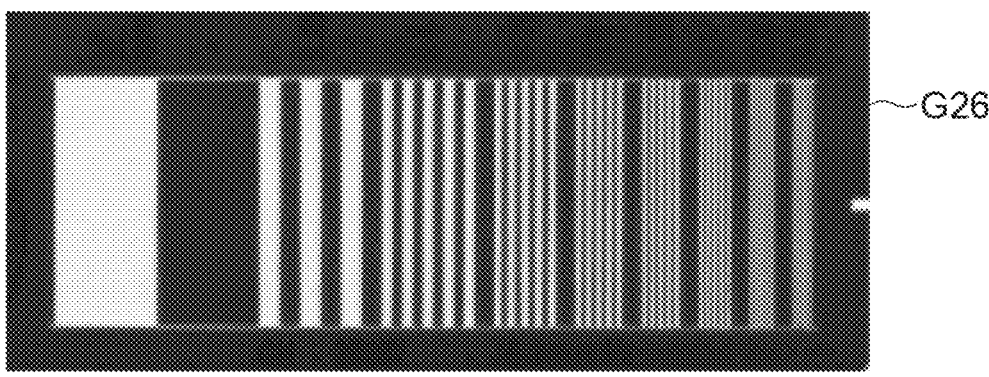
FIG. 12 is a diagram illustrating an example of a jig image used to evaluate resolution.

In a case where a jig having a resolution chart in which the resolution changes stepwise in one direction is used, the specification unit 37A can also acquire the distribution of resolution in the optical image of the jig as the resolution characteristics. Further, the specification unit 37A also has a function of acquiring resolution characteristics of an image after the plurality of trained models 36A are applied to the optical image of the jig and noise removal processing is performed. FIG. 12 shows a jig image G26 of the jig which is a resolution chart. The resolution of the jig image can be measured using a modulation transfer function (MTF) or a contrast transfer function (CTF).

Subsequently, the specification unit 37A applies the plurality of trained models 36A to the jig image. In a case where the jig is a grayscale chart, the specification unit 37A acquires luminance-to-noise ratio characteristics generated as a result of applying the plurality of trained models 36A as the image characteristics. In a case where the jig is a resolution chart, the specification unit 37A acquires resolution characteristics which are the distribution of resolution of an image after noise removal generated as a result of applying the plurality of trained models 36A as the image characteristics.

Subsequently, the selection unit 33A selects the trained model 36A to be used for noise removal processing from the plurality of trained models 36A stored in the optical image processing module 3A on the basis of the image characteristics (imaging information) acquired by the specification unit 37A (step S303). Specifically, the selection unit 33A selects the trained model 36A used to generate an image with relatively excellent characteristics on the basis of the characteristics of the image after the plurality of trained models 36A are applied to the jig image and the noise removal processing is executed. For example, in a case where the jig is a grayscale chart, the selection unit 33A selects the trained model 36A built by image data having the characteristics of a luminance-to-noise ratio closest to the characteristics of a luminance-to-noise ratio acquired by the specification unit 37A as the final trained model 36A. In addition, for example, in a case where the jig is a resolution chart, the selection unit 33A uses the resolution characteristics specified by the specification unit 37A to select the trained model 36A used for an image with the smallest change in the resolution of each distribution before and after the noise removal processing. However, the resolution chart can also be used as an aid in a case where the grayscale chart is used. For example, a condition that there is no change in the resolution obtained by the resolution chart may be added, and the trained model 36 that satisfies the condition may be selected using the grayscale chart. In addition, the image characteristics of the image data used to build the trained model 36A may be acquired from the image data by the selection unit 33A, or may refer to those calculated outside the optical image processing module 3A in advance. Here, the selection unit 33A may select the trained model 36A using the luminance-noise characteristics instead of the characteristics of a luminance-to-noise ratio as the noise characteristics. By using such luminance-noise characteristics, it is possible to specify a dominant noise factor (such as shot noise or a readout noise value) from the slope of the graph in the region of each signal amount with respect to each signal amount detected by the photodetector 21, and to select the trained model 36A on the basis of the specified result.

The optical image processing module 3A of the second embodiment described above includes the image acquisition unit 30A that acquires a jig image and the specification unit 37A that specifies the image characteristics of the jig image, the selection unit 33A uses the image characteristics specified by the specification unit 37A to select the trained model 36A to be used for the noise removal processing from the plurality of trained models 36A, each trained model 36A is a trained model built in advance through machine learning using image data, and the selection unit 33 selects the trained model 36 built in advance on the basis of the image characteristics. Thereby, the image characteristics of the optical image of the structure are specified, the trained model 36A to be used for noise removal is selected from the trained models 36A built in advance on the basis of the image characteristics. This makes it possible to realize optimum noise reduction for each of the image characteristics.

Modification Example

Although various embodiments of the present disclosure have been described above, the embodiments of the present disclosure are not limited to the above embodiments. For example, the building unit 35 may generate a training image by actually performing image capturing when each trained model 36 is built. That is, the training image may be an optical image actually generated using the camera 2 for multiple types of known structures.

Figure 13:
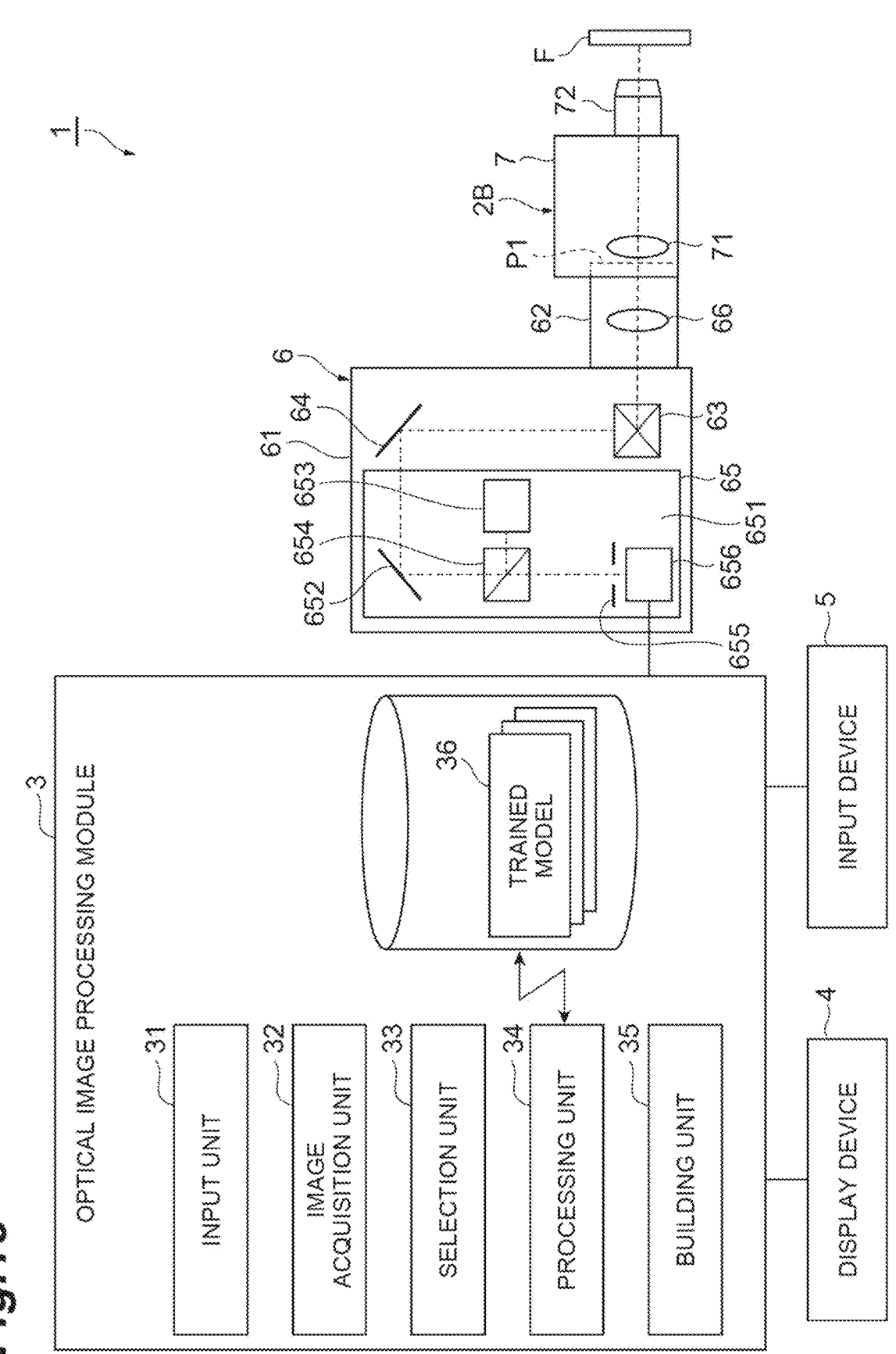
FIG. 13 is a block diagram illustrating a functional configuration of an optical image processing system according to a modification example.

The optical image processing system 1 may be a scanning type. The example shown in FIG. 13 is different from each of the above embodiments in that the optical image processing system 1 includes a confocal microscope 2B. The confocal microscope 2B acquires an image that enables the construction of an optical tomographic image of the target object F. The confocal microscope 2B is configured with a confocal microscope unit 6 connected to a connection port P1 for external unit connection of a microscope 7. This confocal microscope unit 6 is a device that irradiates the target object F disposed on the stage of the microscope 7 or the like with excitation light through a microscope optical system such as an imaging lens 71 or an objective lens 72 in the microscope 7 and receives (detects) fluorescence (light) from the target object F in accordance with its excitation light through the microscope optical system of the microscope 7 to generate and output an optical tomographic image.

Specifically, the confocal microscope unit 6 is configured to include a main housing 61, a lens barrel 62, a scanning mirror 63 fixed in the main housing 61, a fixed mirror 64, a subunit 65, and a scanning lens 66 fixed in the lens barrel 62. The lens barrel 62 constitutes a portion of the main housing 61 and is detachably connected to the connection port P1 of the microscope 7. Each component of the confocal microscope unit 6 will be described in detail below.

The scanning lens 66 in the lens barrel 62 is an optical element for relaying the reflection surface of the scanning mirror 63 to the pupil position of the objective lens 72 and simultaneously condensing excitation light (observation light) onto the primary imaging plane of the microscope optical system of the microscope 7. The scanning lens 66 guides the excitation light scanned by the scanning mirror 63 to the microscope optical system to irradiate the target object F, and accordingly guides fluorescence (observation light) generated from the target object F to the scanning mirror 63. Specifically, the scanning lens 66 is configured to form an image of the pupil of the objective lens 72 on the scanning mirror 63, and guides the fluorescence formed by the objective lens 72 and the imaging lens 71 of the microscope 7 to the scanning mirror 63.

The scanning mirror 63 in the main housing 61 is an optical scanning element such as, for example, a micro electro mechanical system (MEMS) mirror configured to tilt its reflective plate on two axes. The scanning mirror 63 has a role of scanning the target object F with the excitation light output from the subunit 65 by continuously changing its reflection angle, and guiding the fluorescence generated in accordance with the excitation light toward the subunit 65.

The fixed mirror 64 is a light-reflecting element fixed in the main housing 61, which reflects the excitation light output from the subunit 65 toward the scanning mirror 63 and reflects the fluorescence reflected by the scanning mirror 63 toward the subunit 65 coaxially with the excitation light.

The subunit 65 includes a base plate 651, a total reflection mirror 652 disposed on the base plate 651, a light source 653, a dichroic mirror 654, a pinhole plate 655, and a photodetector 656. The total reflection mirror 652 reflects the first excitation light of a wavelength λ1 radiated by the subunit 65 and the first fluorescence of a wavelength range Δλ1 generated from the target object F accordingly. The dichroic mirror 654 is a beam splitter provided in the reflection direction of the first fluorescence of the total reflection mirror 652, which has the property of transmitting the first fluorescence of a wavelength range Δλ1 and reflecting the first excitation light of a wavelength λ1 shorter than the wavelength range Δλ1. The light source 653 is a light-emitting element (for example, a laser diode) that outputs the first excitation light (for example, laser beam) of a wavelength λ1, and is disposed so that the first excitation light is reflected by the dichroic mirror 654 toward the total reflection mirror 652 coaxially with the first fluorescence. The pinhole plate 655 is an aperture member which is disposed so that its pinhole position coincides with the conjugate position of the spot of the first excitation light on the target object F to restrict the light flux of the first fluorescence, and constitutes a confocal optical system together with the light source 653 and the like. This pinhole plate 655 makes it possible to adjust the diameter of the pinhole from the outside and to change the resolution of an image detected by the photodetector 656 and the signal intensity of the image.

Figure 14:
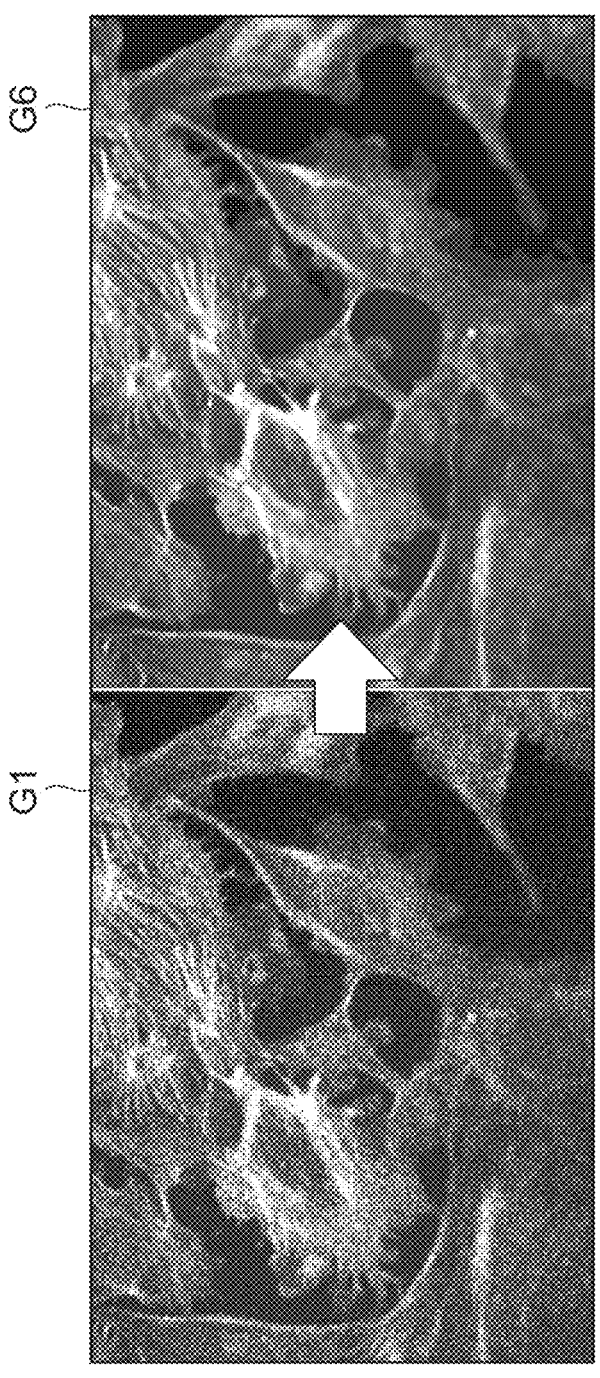
FIG. 14 is a diagram illustrating an example of optical images before and after noise removal processing according to the modification example.

The photodetector 656 is disposed with its detection surface facing the pinhole plate 655 and receives and detects the first fluorescence passing through the pinhole plate 655. Examples of the photodetector 656 include photodetectors (such as, for example, a CCD image sensor and a CMOS image sensor) similar to those in each of the above embodiments. The subunit 65 captures an image of light from the target object F using the photodetector 656 and outputs a digital signal based on the imaging result to the optical image processing module 3. The image acquisition unit 32 of the optical image processing module 3 acquires an optical image by generating image data on the basis of the digital signal received from the subunit 65. With the configuration of the present modification example, in the same way as in each of the above embodiments, the trained model 36 selected in accordance with the imaging environment that changes with the imaging conditions of the target object F is used for noise removal, and thus it is possible to realize noise removal corresponding to a change in the imaging conditions of the target object F. FIG. 14 shows the optical image G1 and the optical image G6 in a case where a PMT is used as the photodetector 656 and the target object F is irradiated with visible light as observation light.

The condition information input from the input unit 31 is not limited to the photodetector information. For example, the condition information may include information indicating a gain setting value of a photodetector 21 used to capture an image of the target object F, each of the trained models 36 may be a trained model built in accordance with a gain setting value of a photodetector 21 that can be input as the condition information, and the selection unit 33 may select the trained model 36 built in advance corresponding to the gain setting value of the photodetector 21 indicated by the photodetector information. In that case, the building unit 35 builds a plurality of trained models 36 as follows. First, differences between the above embodiment and the present modification example in a procedure of creating a training image will be mainly described. In step S102, the building unit 35 acquires the magnitude of noise in accordance with the gain setting value assumed to be capable of being input. The building unit 35 first selects a suitable relational expression on the basis of the photodetector information. The building unit 35 then sets the constant G (information indicating the gain setting value) included in the selected relational expression for each gain setting value assumed to be capable of being input, and calculates the magnitude of noise for each gain setting value. Meanwhile, in the present modification example, a suitable relational expression is selected from Expressions (2) and (3) including the constant G. The building unit 35 then generates a training image in the same way as in the above embodiment on the basis of the noise distribution model set using the sigma value for each gain setting value (step S103 to S107).

Subsequently, differences between the above embodiment and the present modification example in a procedure of observation processing of the optical image of the target object F will be mainly described. In step S201, the input unit 31 accepts an input of the condition information including the photodetector information and the gain setting value from an operator (user) of the optical image processing system 1. In step S203, the selection unit 33 uses the photodetector information and the gain setting value included in the condition information to select the trained model 36 from the plurality of trained models 36 each of which is built in advance through machine learning. That is, in the present modification example, the trained model 36 of the normal distribution model, the trained model 36 of the Poisson distribution model, and the trained model 36 of the Bessel function distribution model are built for each gain setting value assumed to be capable of being input, and an appropriate trained model 36 corresponding to the gain setting value is selected from the plurality of trained models 36 built in this way.

In general, it can be said that the characteristics of noise with respect to luminance differ depending on the gain setting value of the photodetector 21. According to the present modification example, the trained model 36 corresponding to the gain setting value is selected from the plurality of trained models 36 built in accordance with the gain setting value of the photodetector 21, and thus it is possible to remove noise from the optical image of the target object F corresponding to the above gain setting value.

In addition, for example, the condition information may include information indicating a readout mode of a photodetector 21 used to capture an image of the target object F, each of the trained models 36 may be a trained model built in accordance with a readout mode of a photodetector 21 that can be input as the condition information, and the selection unit 33 may select the trained model 36 built in advance corresponding to the readout mode of the photodetector 21 indicated by the photodetector information. In that case, the building unit 35 builds the plurality of trained models 36 as follows. First, differences between the above embodiment and the present modification example in a procedure of creating a training image will be mainly described. In step S102, the building unit 35 acquires the magnitude of noise in accordance with a readout mode assumed to be capable of being input. The building unit 35 first selects a suitable relational expression on the basis of the photodetector information. The building unit 35 then sets the constant R (information indicating the readout noise value corresponding to the readout mode) included in the selected relational expression for each readout noise value assumed to be capable of being input, and calculates the magnitude of noise for each readout noise value. Meanwhile, in the present modification example, a suitable relational expression is selected from Expressions (1) and (2) including the constant R. The building unit 35 then generates a training image in the same way as in the above embodiment on the basis of the noise distribution model set using the sigma value for each readout noise value (steps S103 to S107).

Subsequently, differences between the above embodiment and the present modification example in the procedure of observation processing of the optical image of the target object F will be mainly described. In step S201, the input unit 31 accepts an input of the condition information including the photodetector information and the readout noise value information from an operator (user) of the optical image processing system 1. In step S203, the selection unit 33 uses the photodetector information and the readout noise value included in the condition information to select the trained model 36 from the plurality of trained models 36 each of which is built in advance through machine learning. That is, in the present modification example, the trained model 36 of the normal distribution model, the trained model 36 of the Poisson distribution model, and the trained model 36 of the Bessel function distribution model are built for each readout noise value assumed to be capable of being input, and an appropriate trained model 36 corresponding to the readout noise value is selected from the plurality of trained models 36 built in this way.

In general, it can be said that the characteristics of noise with respect to luminance differ depending on the readout mode of the photodetector 21. According to the present modification example, the trained model 36 corresponding to the readout mode is selected from the plurality of trained models 36 built in accordance with the readout mode of the photodetector 21 (specifically, the readout noise value corresponding to the readout mode), and thus it is possible to remove noise from the optical image of the target object F corresponding to the above readout mode.

The optical image processing method may further include an input step of accepting an input of condition information indicating imaging conditions when an image of the target object is captured, the imaging information may include the condition information, each of the plurality of trained models may be a trained model built in advance through machine learning using a predetermined noise distribution model, and the selection step may include selecting the trained model built in advance corresponding to the condition information. In addition, the optical image processing module may further include an input unit configured to accept an input of condition information indicating imaging conditions when an image of the target object is captured, the imaging information may include the condition information, each of the plurality of trained models may be a trained model built in advance through machine learning using a predetermined noise distribution model, and the selection unit may select the trained model built in advance corresponding to the condition information. Thereby, the most suitable trained model is selected from the plurality of trained models that appropriately remove noise in consideration of the imaging conditions of the target object, and thus it is possible to remove noise from the optical image of the target object corresponding to a change in the imaging conditions.

In the optical image processing method, the condition information may include information indicating a type of photodetector used to capture an image of the target object, each of the plurality of trained models may be a trained model built in accordance with the type of photodetector that can be input as the condition information, and the selection step may include selecting the trained model built in advance using the predetermined noise distribution model corresponding to the type of photodetector indicated by the condition information. In addition, in the optical image processing module, the condition information may include information indicating a type of photodetector used to capture an image of the target object, each of the plurality of trained models may be a trained model built in accordance with the type of photodetector that can be input as the condition information, and the selection unit may select the trained model built in advance using the predetermined noise distribution model corresponding to the type of photodetector indicated by the condition information. In general, it can be said that the characteristics of noise with respect to luminance differ depending on the type of photodetector. According to the above configuration, the trained model corresponding to the photodetector used to capture an image of the target object is selected from the plurality of trained models built in accordance with the type of photodetector, and thus it is possible to remove noise from the optical image of the target object corresponding to the photodetector used for the target object.

In the optical image processing method, the condition information may include information indicating a gain setting value of a photodetector used to capture an image of the target object, each of the plurality of trained models may be a trained model built in accordance with a gain setting value of a photodetector that can be input as the condition information, and the selection step may include selecting the trained model built in advance corresponding to the gain setting value of the photodetector indicated by the condition information. In addition, in the optical image processing module, the condition information may include information indicating a gain setting value of a photodetector used to capture an image of the target object, each of the plurality of trained models may be a trained model built in accordance with a gain setting value of a photodetector that can be input as the condition information, and the selection unit may select the trained model built in advance corresponding to the gain setting value of the photodetector indicated by the condition information. In general, it can be said that the characteristics of noise with respect to luminance differ depending on the gain setting value of the photodetector. According to the above configuration, the trained model corresponding to the gain setting value is selected from the plurality of trained models built in accordance with the gain setting value of the photodetector, and thus it is possible to remove noise from the optical image of the target object corresponding to the above gain setting value.

In the optical image processing method, the condition information may include information indicating a readout mode of a photodetector used to capture an image of the target object, each of the plurality of trained models may be a trained model built in accordance with a readout mode of a photodetector that can be input as the condition information, and the selection step may include selecting the trained model built in advance corresponding to the readout mode of the photodetector indicated by the condition information. In addition, in the optical image processing module, the condition information may include information indicating a readout mode of a photodetector used to capture an image of the target object, each of the plurality of trained models may be a trained model built in accordance with a readout mode of a photodetector that can be input as the condition information, and the selection unit may select the trained model built in advance corresponding to the readout mode of the photodetector indicated by the condition information. In general, it can be said that the characteristics of noise with respect to luminance differ depending on the readout mode of the photodetector. According to such a configuration, the trained model corresponding to the readout mode is selected from the plurality of trained models built in accordance with the readout mode of the photodetector, and thus it is possible to remove noise from the optical image of the target object corresponding to the above readout mode.

In the above embodiment, the noise distribution model may include at least one of a normal distribution model and a Poisson distribution model. Thereby, for example, in a case where the general photodetector which is not an electron multiplication type is used to capture an image of the target object, it is possible to effectively remove noise in the optical image by selecting a trained model built through machine learning using a normal distribution model or a trained model built through machine learning using a Poisson distribution model.

In the above embodiment, the noise distribution model may include a Bessel function distribution model. Thereby, for example, in a case where the electron multiplication-type photodetector is used to capture an image of the target object, it is possible to effectively remove noise in the optical image by selecting a trained model built through machine learning using a Bessel function distribution model.

The optical image processing method may further include a second image acquisition step of acquiring an optical image of a structure having a predetermined structure by capturing an image of light from the structure and a specification step of specifying image characteristics of the optical image of the structure, the imaging information may include the image characteristics, each of the plurality of trained models may be a trained model built in advance through machine learning using image data, and the selection step may include selecting the trained model built in advance on the basis of the image characteristics. In addition, the optical image processing module may further include a second image acquisition unit configured to acquire an optical image of a structure having a predetermined structure by capturing an image of light from the structure and a specification unit configured to specify image characteristics of the optical image of the structure, the imaging information may include the image characteristics, each of the plurality of trained models may be a trained model built in advance through machine learning using image data, and the selection unit may select the trained model built in advance on the basis of the image characteristics. Thereby, the image characteristics of the optical image of the structure are specified, and the trained model to be used for noise removal is selected from the trained models built in advance on the basis of the image characteristics. This makes it possible to realize optimum noise reduction for each of the image characteristics.

The machine learning pre-processing method further includes an input step of accepting an input of condition information including photodetector information indicating a type of photodetector used to capture an image of a target object, and the training image generation step includes determining the noise distribution model to be used from the photodetector information. The relationship between the pixel value and noise in the optical image varies depending on the type of photodetector used to capture an image of the target object. According to the above configuration, it is possible to obtain a training image in which noise is appropriately added to an optical image in consideration of the type of photodetector used to capture an image of the target object. As a result, it is possible to build a trained model that executes noise removal in the optical image of the target object corresponding to the photodetector.

In the machine learning pre-processing method, the noise distribution model may include at least one of a normal distribution model and a Poisson distribution model. Thereby, for example, in a case where the general photodetector which is not an electron multiplication type is used to capture an image of the target object, it is possible to obtain a training image in which noise is appropriately added to the optical image. As a result, it is possible to build a trained model that executes noise removal in the optical image of a target object corresponding to the type of photodetector.

In the machine learning pre-processing method, the noise distribution model may include a Bessel function distribution model. Thereby, for example, in a case where the electron multiplication-type photodetector is used to capture an image of the target object, it is possible to obtain a training image in which noise is appropriately added to the optical image. As a result, it is possible to build a trained model that executes noise removal in the optical image of a target object corresponding to the type of photodetector.

REFERENCE SIGNS LIST

1, 1A Optical image processing system
2 Camera (imaging device)
3, 3A Optical image processing module
21, 656 Photodetector
30A Image acquisition unit (second image acquisition unit)
31 Input unit
32, 32A Image acquisition unit (first image acquisition unit)
33, 33A Selection unit
34 Processing unit
35 Building unit
36, 36A Trained model
37A Specification unit
F Target object
G1, G6 Optical image
G26, G27 Jig image (optical image of structure)
Gc Structure image
Gt Training image
L Light

The invention claimed is:

1. An optical image processing method comprising:

acquiring an optical image obtained by capturing an image of light from a target object;

selecting a trained model from a plurality of trained models each of which is built in advance through machine learning, by using imaging information relating to capturing an image of the target object;

inputting the optical image to the selected trained model and executing image processing of removing noise from the optical image; and accepting an input of condition information indicating imaging conditions when an image of the target object is captured, wherein the imaging information includes the condition information, each of the plurality of trained models is a trained model built in advance through machine learning using a predetermined noise distribution model, and selecting of the trained model includes selecting the trained model built in advance corresponding to the condition information.

2. The optical image processing method according to claim 1, wherein the condition information includes information indicating a type of photodetector used to capture an image of the target object, each of the plurality of trained models is a trained model built in accordance with the type of photodetector which is capable of being input as the condition information, and selecting of the trained model includes selecting the trained model built in advance using the predetermined noise distribution model corresponding to the type of photodetector indicated by the condition information.

3. The optical image processing method according to claim 1, wherein the condition information includes information indicating a gain setting value of a photodetector used to capture an image of the target object, each of the plurality of trained models is a trained model built in accordance with a gain setting value of a photodetector which is capable of being input as the condition information, and selecting of the trained model includes selecting the trained model built in advance corresponding to the gain setting value of the photodetector indicated by the condition information.

4. The optical image processing method according to claim 1, wherein the condition information includes information indicating a readout mode of a photodetector used to capture an image of the target object, each of the plurality of trained models is a trained model built in accordance with a readout mode of a photodetector which is capable of being input as the condition information, and selecting of the trained model includes selecting the trained model built in advance corresponding to the readout mode of the photodetector indicated by the condition information.

5. The optical image processing method according to claim 1, wherein the noise distribution model includes at least one of a normal distribution model and a Poisson distribution model.

6. The optical image processing method according to claim 1, wherein the noise distribution model includes a Bessel function distribution model.

7. The optical image processing method according to claim 1, further comprising:

acquiring an optical image of a structure having a predetermined structure by capturing an image of light from the structure; and specifying image characteristics of the optical image of the structure, wherein the imaging information includes the image characteristics, each of the plurality of trained models is a trained model built in advance through machine learning using image data, and selecting of the trained model includes selecting the trained model built in advance on the basis of the image characteristics.

8. A machine learning pre-processing method in a machine learning method, the machine learning method comprising using a structure image to which noise is added based on a predetermined noise distribution model as a training image and using the training image and noise-removed image data which is data obtained by removing noise from the training image as training data to build a trained model that outputs the noise-removed image data on the basis of the training image through machine learning, the machine learning pre-processing method comprising generating a structure image to which noise is added based on the noise distribution model as the training image.

9. A trained model built using the machine learning pre-processing method according to claim 8, the trained model causing a processor to execute image processing of removing noise from an optical image of a target object.

10. The machine learning pre-processing method according to claim 8, further comprising accepting an input of condition information including photodetector information indicating a type of photodetector used to capture an image of a target object, wherein generating of the structure image includes determining the noise distribution model to be used from the photodetector information.

11. The machine learning pre-processing method according to claim 10, wherein the noise distribution model includes at least one of a normal distribution model and a Poisson distribution model.

12. The machine learning pre-processing method according to claim 10, wherein the noise distribution model includes a Bessel function distribution model.

13. An optical image processing module comprising a processor configured to:

acquire an optical image obtained by capturing an image of light from a target object;

select a trained model from a plurality of trained models each of which is built in advance through machine learning by using imaging information relating to capturing an image of the target object; and input the optical image to the selected trained model and execute image processing of removing noise from the optical image, wherein the processor accepts an input of condition information indicating imaging conditions when an image of the target object is captured, the imaging information includes the condition information, each of the plurality of trained models is a trained model built in advance through machine learning using a predetermined noise distribution model, and the processor selects the trained model built in advance corresponding to the condition information.

14. The optical image processing module according to claim 13, wherein the condition information includes information indicating a type of photodetector used to capture an image of the target object, each of the plurality of trained models is a trained model built in accordance with the type of photodetector which is capable of being input as the condition information, and the processor selects the trained model built in advance using the predetermined noise distribution model corresponding to the type of photodetector indicated by the condition information.

15. The optical image processing module according to claim 13, wherein the condition information includes information indicating a gain setting value of a photodetector used to capture an image of the target object, each of the plurality of trained models is a trained model built in accordance with a gain setting value of a photodetector which is capable of being input as the condition information, and the processor selects the trained model built in advance corresponding to the gain setting value of the photodetector indicated by the condition information.

16. The optical image processing module according to claim 13, wherein the condition information includes information indicating a readout mode of a photodetector used to capture an image of the target object, each of the plurality of trained models is a trained model built in accordance with a readout mode of a photodetector which is capable of being input as the condition information, and the processor selects the trained model built in advance corresponding to the readout mode of the photodetector indicated by the condition information.

17. The optical image processing module according to claim 13, wherein the noise distribution model includes at least one of a normal distribution model and a Poisson distribution model.

18. The optical image processing module according to claim 13, wherein the noise distribution model includes a Bessel function distribution model.

19. The optical image processing module according to claim 13, wherein the processor acquires an optical image of a structure having a predetermined structure obtained by capturing an image of light from the structure; and specifies image characteristics of the optical image of the structure, wherein the imaging information includes the image characteristics, each of the plurality of trained models is a trained model built in advance through machine learning using image data, and the processor selects the trained model built in advance on the basis of the image characteristics.

20. The optical image processing module according to claim 13, wherein the processor uses a structure image to which noise is added based on a predetermined noise distribution model as a training image and use the training image and noise-removed image data which is data obtained by removing noise from the training image as training data to build a trained model that outputs the noise-removed image data on the basis of the training image through machine learning.

21. A non-transitory computer-readable medium causing a processor to function as:

acquiring an optical image obtained by capturing an image of light from a target object;

using imaging information relating to capturing an image of the target object to select a trained model from a plurality of trained models each of which is built in advance through machine learning;

inputting the optical image to the selected trained model and executing image processing of removing noise from the optical image;

accepting an input of condition information indicating imaging conditions when an image of the target object is captured, the imaging information including the condition information, and each of the plurality of trained models is a trained model built in advance through machine learning using a predetermined noise distribution model; and selecting the trained model built in advance corresponding to the condition information.

22. An optical image processing system comprising:

the optical image processing module according to claim 13; and an imaging device configured to acquire the optical image by capturing an image of light from the target object.

* * * * *